US012229763B1

(12) United States Patent
Collins et al.

(10) Patent No.: US 12,229,763 B1
(45) Date of Patent: Feb. 18, 2025

(54) SYSTEMS AND METHODS FOR PAYMENT FINANCING AT POINT OF SALE

(71) Applicant: Citibank, N.A., New York, NY (US)

(72) Inventors: Declan Collins, Darien, CT (US); Michael Naggar, Dallas, TX (US)

(73) Assignee: CITIBANK, N.A., New York, NY (US)

( * ) Notice: Subject to any disclaimer, the term of this patent is extended or adjusted under 35 U.S.C. 154(b) by 90 days.

(21) Appl. No.: 17/547,052

(22) Filed: Dec. 9, 2021

(51) Int. Cl.
*G06Q 20/38* (2012.01)
(52) U.S. Cl.
CPC .................... *G06Q 20/388* (2013.01)
(58) Field of Classification Search
CPC ........................................... G06Q 20/388
USPC ............................................. 705/44
See application file for complete search history.

(56) References Cited

U.S. PATENT DOCUMENTS

| | | | | |
|---|---|---|---|---|
| 11,574,310 B2 * | 2/2023 | Law | ............... | G06Q 20/12 |
| 2014/0279509 A1 * | 9/2014 | Khilnani | ............... | G06Q 20/227 |
| | | | | 705/44 |
| 2019/0066150 A1 * | 2/2019 | Nowlan | ............... | G06Q 30/0274 |
| 2021/0192867 A1 * | 6/2021 | Fang | ............... | G07C 5/0816 |
| 2021/0342882 A1 * | 11/2021 | Saganvali | ............... | G06Q 30/0255 |
| 2023/0105171 A1 * | 4/2023 | Beye | ............... | G06F 21/6254 |
| | | | | 713/193 |

FOREIGN PATENT DOCUMENTS

CA          2980029 A1 *  3/2019

* cited by examiner

*Primary Examiner* — Paul S Schwarzenberg
(74) *Attorney, Agent, or Firm* — Foley & Lardner LLP

(57) ABSTRACT

A system for dynamically revising a merchant page by one or more processors communicatively coupled to webservers hosting merchant pages may be configured to receive from a webserver a transaction amount and a unique identifier of a user interacting with the page without an input of a credit card number of the user and without the webserver accessing the credit card number in a data storage, identify, using the unique identifier and without receiving personally identifiable information from the webserver, a user profile including at least one dataset corresponding to a credit card of the user, and upon identifying an attribute of an alternative payment option for the user based on the user profile, generate an instruction to the webserver to dynamically render the page by displaying at least one interactive element including the alternative payment option based on an indicator of the credit card of the user.

20 Claims, 10 Drawing Sheets

REVIEW AND PAY

ORDER SUMMARY
DEPART
DALLAS/ FT WORTH, TX TO LOS ANGELES, CA
WEDNESDAY, MARCH 18

| FLIGHT | DEPART | ARRIVE | TRAVEL TIME | AIRCRAFT | CABIN | SEATS |
|---|---|---|---|---|---|---|
| 1126 | 9:20 AM LAX | 10:30 AM LAS | 1H 10M | 738 | ECONOMY | 13D |
| | | STOP : LAS VEGAS, NV (LAS) | | | | |
| 1524 | 11:10 AM LAS | 3:50 PM DFW | 2H 40M | M80 | ECONOMY | 13D |

— 302

COST SUMMARY

YOUR TOTAL
$335.47
PRICE FOR ALL PASSENGERS
PRICE AND TAX INFORMATION
INCLUDES TAXES AND CARRIER IMPOSED FEES
BAGGAGE AND OPTIONAL SERVICE FEES

PASSENGER
| | |
|---|---|
| TRIP DFW / LAX | $296.00 |
| TAXES | $20.20 |
| CARRIER-IMPOSED FEES | $0.00 |
| SUBTOTAL | $280.68 |
| EXTRAS | |
| PREFERRED SEAT (2) | $54.79 |
| TOTAL (ALL PASSENGERS) | $335.47 |

— 304

| | |
|---|---|
| YOUR PRICE: | $160.00 |
| CARD STATEMENT CREDIT: | -$50.00 |
| TOTAL AFTER STATEMENT CREDIT: | $110.00 |

— 306

PAYMENT — 307
321 SELECT A PAYMENT OPTION
◎ CREDIT CARD ON FILE
[ PLATINUM ****8204 ]   [ SECURITY CODE ]
              — 323
◦ EDIT CARD INFORMATION

— 311

INSTALLMENT OPTIONS
| PAY IN FULL | 9 MONTHS | 6 MONTHS | 3 MONTHS |
|---|---|---|---|
| ◎ $336 / TOTAL | ◎ $47 / MO 5.99% APR | ◎ $62 / MO 5.99% APR | ◎ $117 / MO 5.99% APR |

◦ OTHER OFFERS
◦ TERMS AND CONDITIONS

— 312   — 313   — 314   — 315

◯ CREDIT CARD   [VISA] [ ] [DISCOVER] [UATP] [ ]
◯ OTHER FORM OF PAYMENT   — 308
◯ HOLD   — 309
— 310

[ PAYMENT NOW ] — 316

FIG. 3

Payment
Select a payment option

Enter your BB loyalty credit card ending in 5496 below to see how you can pay using fixed monthly payments Card type° — Select a card type
Card number°
Expiration date °
Month — Select month
Year — Select year First name°
Middle name
Last name°

Installment option

| PAY IN FULL | 9 MONTHS | 6 MONTHS | 3 MONTHS |
|---|---|---|---|
| ◉ $336 / total | ◉ $47 / mo 5.99% APR | ◉ $62 / mo 5.99% APR | ◉ $117 / mo 5.99% APR |

◉ Other Offers
◉ Terms and Conditions

FIG. 4

SYSTEMS AND METHODS FOR PAYMENT FINANCING AT POINT OF SALE

TECHNICAL FIELD

This application is generally directed towards dynamic interactive graphical user interfaces that are customized for consumers without transmitting personally identifiable information.

BACKGROUND

One problem with online credit card transactions relates to securely handling the transaction while preventing users from entering personal identity information (e.g., credit card information). A card-on-file (COF) transaction is a transaction where a cardholder authorized a merchant to store the cardholder's sensitive credit card data. However, storing credit card data may expose the cardholder to security risks. Moreover, some cardholders may not desire COF transactions because adding a payment card is a time-consuming and inconvenient process that may not be desired for merchants with which the cardholder does not transact often.

Another problem relates to securely handling a co-branded credit card transaction while offering additional benefits to cardholders, e.g., providing flexible payment options at point of sale (e.g., at time of checkout). Many merchants use traditional technology that does not allow for sourcing offers in real time on a credit card that the user has just entered. To offer benefits to cardholders of co-branded credit cards, sensitive credit card information (e.g., credit card number) may need to be shared between the merchant and the credit card issuer. For example, the two organizations may need a regular exchange of a large number of files. This exchange overhead does not enable the card issuer to offer flexible payment options based on real time data at time of checkout.

SUMMARY

To solve these problems, according to certain aspects, embodiments in the present disclosure relate to techniques for utilizing mapping between a merchant's program (e.g., loyalty program user identifiers or membership program numbers) and card numbers of co-brand credit cards when the co-branded credit cards are available for the program. Such program to card number mapping can be used for mileage accumulations, boarding privileges etc. for airline merchants, for example. A merchant may identify or determine program membership numbers (e.g., loyalty program numbers) for logged-in customers on the merchant's website which in turn can be mapped to eligible card numbers of co-brand cards. The merchant (or the merchant's system or webserver) may determine the program numbers to credit card numbers mapping via an application programming interface (API) of the credit card issuer. In some configurations, the card number may not be shared with the merchant. Instead, only a unique identifier may be shared with the merchant (e.g., enough for the user to identify the card, such as the last four digits of the card and/or the card name).

There is a desire for an electronic platform that seamlessly displays alternative (installment) payment options for which users qualify. Described herein are methods and systems to dynamically revise an electronic platform (e.g., website) to display customized alternative (installment) payment options without requesting personally identifiable information or other sensitive data. The methods and systems described herein reduce data entry time and offer flexible payment options based on real time data at time of checkout. As used herein, payment options may also include any alternative or promotional payment option. Therefore, an alternative payment option may include using a particular card to receive more points or paying via installment plans to take advantage of a promotion (e.g., 0%).

In one embodiment, a method for dynamically revising a merchant page by one or more processors communicatively coupled to a plurality of webservers hosting a plurality of merchant pages may include receiving, by one or more processors from a webserver of the plurality of webservers hosting a merchant page of the plurality of merchant pages, a transaction amount and a unique identifier associated with a user of a user computing device interacting with the merchant page without an input of a credit card number of the user and without the webserver accessing the credit card number in a data storage. The method may include identifying, by the one or more processors using the unique identifier and without receiving personally identifiable information from the webserver, a user profile comprising at least one dataset corresponding to a credit card of the user. The method may include, upon identifying, by the one or more processors, an attribute of an alternative payment option for the user based on the user profile, generating, by the one or more processors, an instruction to the webserver to dynamically render the merchant page by displaying at least one interactive graphical element comprising the alternative payment option based on an indicator of the credit card of the user.

In another embodiment, a system for dynamically revising a merchant page by one or more processors communicatively coupled to a plurality of webservers hosting a plurality of merchant pages may include one or more processors. The one or more processors are configured to receive, from a webserver of the plurality of webservers hosting a merchant page of the plurality of merchant pages, a transaction amount and a unique identifier associated with a user of a user computing device interacting with the merchant page without an input of a credit card number of the user and without the webserver accessing the credit card number in a data storage. The one or more processors are configured to identify, using the unique identifier and without receiving personally identifiable information from the webserver, a user profile comprising at least one dataset corresponding to a credit card of the user. Upon identifying an attribute of an alternative payment option for the user based on the user profile, the one or more processors are configured to generate an instruction to the webserver to dynamically render the merchant page by displaying at least one interactive graphical element comprising the alternative payment option based on an indicator of the credit card of the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

FIGS. 3-5 illustrate various graphical user interfaces and elements displayed by an analytics server through a merchant webserver, in accordance with different embodiments.

DETAILED DESCRIPTION

Figure 1:
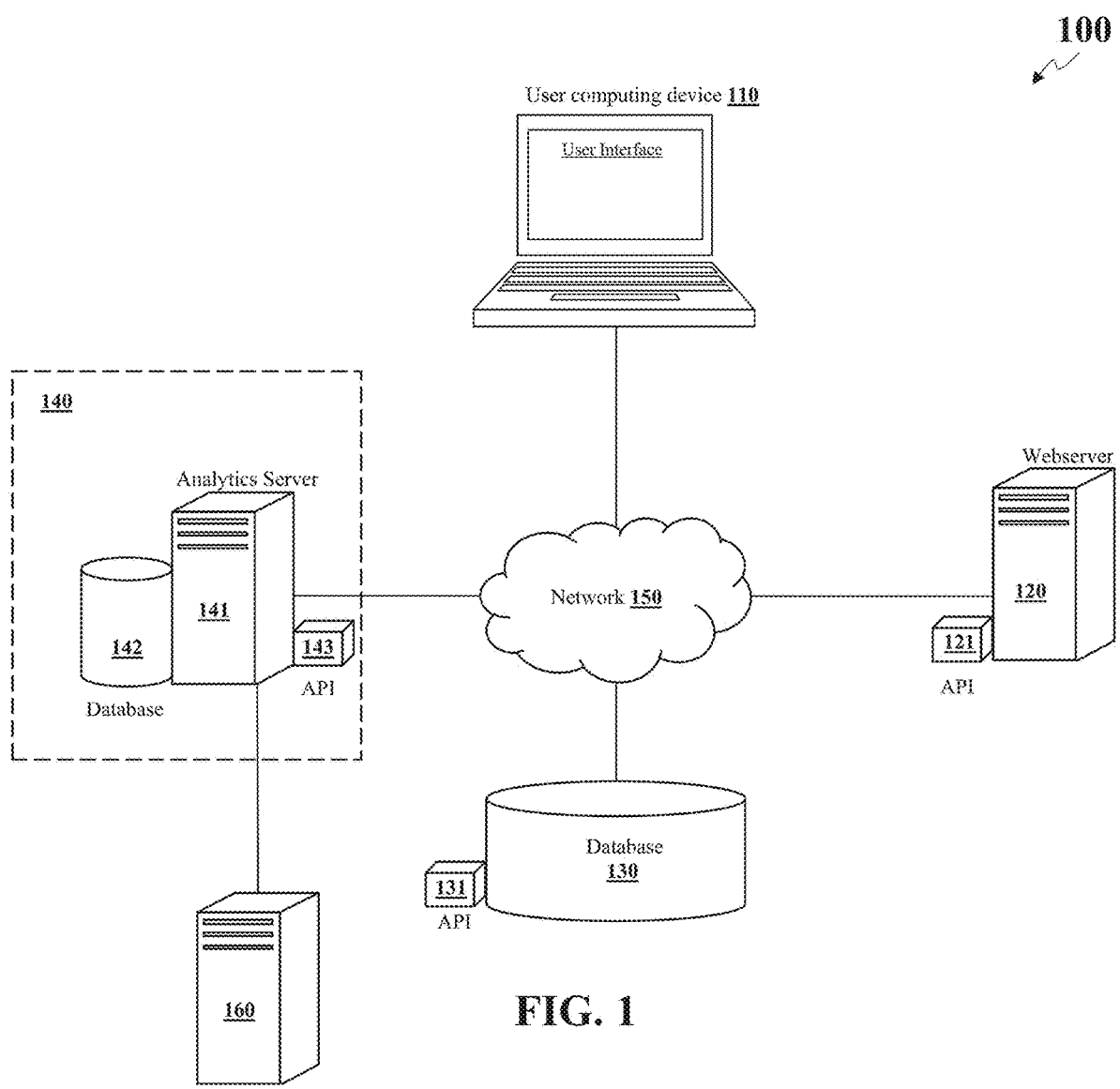
FIG. 1 illustrates a computer system for dynamically revising pages with payment financing options, in accordance with an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to systems and methods for presenting payment financing options in a point-of-sale (POS) system using a dynamic interactive graphical user interfaces (GUIs). Embodiments disclosed herein describe a system for changing GUIs and data records may include one or more processors. The one or more processors are configured to receive, from a webserver hosting a merchant page, a transaction amount and a unique identifier associated with a user of a user computing device interacting with the merchant page without an input of a credit card number of the user and without the webserver accessing the credit card number in a data storage. The one or more processors are configured to identify, using the unique identifier and without receiving personally identifiable information from the webserver, a user profile comprising at least one dataset corresponding to a credit card of the user. The one or more processors are configured to identify an attribute of an alternative payment option for the user based on the user profile. The one or more processors are configured to instruct the webserver to dynamically render the merchant page by displaying at least one interactive graphical element comprising the alternative payment option based on an indicator of the credit card of the user.

A payment financing system may use such mapping between program numbers to credit card numbers to allow a co-brand partner (e.g., merchant) to make user-specific and/or card-specific financing offers on their website and/or mobile application (or mobile app) for co-brand credit card accounts. In providing such financing offers on the merchant's website and/or mobile application (or mobile app), it is possible that the account numbers (credit card numbers) of a credit card issuer are not shared with its partner merchant. This promotion of financing offers may be referred to as an awareness banner (or awareness placement). The awareness banner is particularly useful when the merchant's property or product has a low card-on-File (COF) penetration rate and the merchant is unable to offer user-specific and/or account-specific offers in advance of card entry. The payment financing system can use the awareness banner to promote the partner's (or merchant's) co-branded card products through attractive financing offers before account number entry and thus can influence choice of account and/or card used. In this approach, it is possible that the payment financing system does not require sharing of account numbers with the merchant to render user-specific and/or card-specific offers.

The payment financing system may implement the awareness banner using an API provided by the credit card issuer and callable by the merchant. A merchant's system (e.g., webserver) can invoke or call the API to establish or determine the program numbers (or identifiers) to credit card numbers mapping at an account acquisition time. In this manner, card numbers do not need to be shared with the merchant. If necessary, a legal department of either partner organization may authorize the sharing of data (e.g., mapping data) and/or the use of the API as permitted by the program rules.

The payment financing system may extend or offer or provide a point-of-sale (POS) payment financing to a merchant when a user purchases an item from a merchant website. For example, a user who is associated with a program number can login to the merchant website, browse product web pages for purchase of a product item, and then see flexible payment options on a checkout page on the merchant website.

The payment financing system may process or handle card-on-file (COF) transactions in which pre-stored credit card information can be used for processing a transaction. After a user logins to the system (e.g., the merchant website) and browse product web pages for purchase of a product item, the system may display financing terms and determine whether a co-branded credit card of the user is eligible for financing. In response to determining that the co-branded credit card is eligible, the system may determine whether the eligible co-branded credit card is a default COF. In response to determining that the eligible co-branded credit card is the default COF, the system may automatically display offered financing details (e.g., flexible payment options or installment payment options) on a Checkout page. Alternatively, if the eligible co-branded card is not the default COF, an awareness banner may be displayed advising that said COF card has financing available.

After the user enters an account number, the system may compare the user-entered account number with the correct account number of the eligible co-branded credit card. In response to determining that the user-entered account number matches the correct account, the system may display details of a financing offer.

The payment financing system may process or handle card-on-file (COF) transactions (non-COF scenario). After a user associated with a program number logins to the system (e.g., the merchant website) and browse product web pages for purchase of a product item, the system may display financing terms, determine the program numbers (or identifiers) to credit card numbers mapping, and determine, based on the mapping, whether a co-branded credit card of the user is eligible for financing. In response to determining that the co-branded credit card is eligible, the system may display an awareness placement (or awareness banner) prompting the user to enter the account number of the eligible co-branded credit card to see the offer details. After the user enters an account number, the system may compare the user-entered account number with the correct account number of the eligible co-branded credit card. In response to determining that the user-entered account number matches the correct account, the system may display details of a financing offer. In this manner, financing offers can be only available to logged-in co-brand cardholders on the merchant website and/or merchant mobile application (or mobile app) if the cardholders enter the correct account number of their co-branded credit cards. The system (or the awareness placement) may identify an eligible co-branded credit card with (1) a product name of a co-branded credit card (e.g., platinum/executive card) and (2) partial information (e.g., last 4 digits) of the account number of the co-branded credit card. In displaying the details of a financing offer, the system may open up a web page in an accordion-style to display a financing section which includes the financing offer.

For example, in a non-COF scenario, using an airline company as an example merchant which has a co-brand credit card with a partner credit card issuer, users can log into a website of the merchant. The merchant may run a program using program numbers associated with its customers. Before a web page and/or a mobile screen is rendered to a user, a merchant-side system (or a merchant website) can pass a program number associated with that user to a system on a credit card issuer side through an API. The card-issuer side system can then use the program number to locate or identify co-brand credit card account(s) connected to (or associated with) that program number through the existing mapping used for mileage accumulations, etc. The card issuer-side system can locate or identify financing offers on those accounts and return user-specific and/or account-specific information to the merchant-side system without revealing the credit card account number. The merchant-side system can use this user-specific and/or account-specific information to create or generate a personalized offer (known as an awareness banner or an awareness placement) using interactive graphical elements (e.g., web page or web UI (user interface) or web UX (user experience)), prompting the user to enter the account number to see the offer details. The merchant-side system may display financing offer details when the user enters the matching card number.

An example use case of a payment financing system according to some embodiments will be described as follows. A merchant offer sourcing process may start with a step of a user logging into a merchant website. The merchant or a merchant-side system (e.g., merchant website) may determine a program (or membership) number of the user. The merchant or the merchant-side system may check to determine if at least one co-branded credit card attached to the program number. The merchant-side system may perform this checking using user profile data which indicate whether at least one co-branded credit card is associated with the user or the program number. The co-branded credit card may be based on the merchant-card issuer partnership and is associated with the program. In response to determining that at least one co-branded credit card is attached to the program number, the merchant-side system may invoke or call an API with the program number. The API may be provided by the card issuer. The merchant-side system may invoke the API to execute a software module implemented in a card issuer-side system. In response to determining that at least one co-branded credit card is not attached to the program number, the merchant offer sourcing process may inform the user that there is no financing offer available due to no financing offer route, and complete. The card issuer or the card issuer-side system may check to determine if financing is available on the co-branded credit card(s) linked to the program number. In response to determining that financing is available on the co-branded credit card(s) linked to the program number, the card issuer-side system may return best offer(s) to the merchant-side system. The merchant or the merchant-side system may inform the user of the returned financing offer(s) available on the co-branded credit card(s). For example, the merchant-side system may identify the financing offer with a product name (e.g., "platinum/executive card") and partial information (e.g., last 4-digits) of the co-branded credit card, and display, on a web page, details of the financing offer. In response to determining that financing is not available on the co-branded credit card(s) linked to the program number, the merchant offer sourcing process may inform the user that there is no financing offer available due to no financing offer route, and complete.

According to certain aspects, a system for dynamically revising a merchant page by one or more processors communicatively coupled to a plurality of webservers hosting a plurality of merchant pages may include one or more processors configured to receive, from a webserver of the plurality of webservers hosting a merchant page of the plurality of merchant pages, a transaction amount and a unique identifier associated with a user of a user computing device interacting with the merchant page without an input of a credit card number of the user and without the webserver accessing the credit card number in a data storage. The one or more processors are configured to identify, using the unique identifier and without receiving personally identifiable information from the webserver, a user profile comprising at least one dataset corresponding to a credit card of the user. Upon identifying an attribute of an alternative payment option for the user based on the user profile, the one or more processors are configured to generate an instruction to the webserver to dynamically render the merchant page by displaying at least one interactive graphical element comprising the alternative payment option based on an indicator of the credit card of the user.

The one or more processors may be further configured to execute the alternative payment option based on the selected interactive graphical element, responsive to a selected interactive graphical element on the merchant page. In executing the alternative payment option, the one or more processors are configured to add the transaction amount to an account associated with the credit card number of the user. The transaction amount may not be routed to a secondary server associated with facilitating the transaction. The secondary server may be associated with a credit card company. This optional step may be performed as a result of the merchant conveying the user's selection/intention to a server associated with the card issuer (e.g., the analytics server discussed herein).

In some configurations, the transaction may be facilitated using existing financial infrastructure. For instance, the card issuer may process the transaction as any other transaction conducted by a user (e.g., other card present or card not present transaction). When the card issuer receives data associated with the transaction, the card issuer may use the earlier selection/intention instructions to facilitate the transaction. In some other configurations (e.g., when the user has selected to pay in multiple installments), the issuer may facilitate the transaction in accordance with the user's selection, such that the user's account reflects the installment plan.

In some configurations, the one or more processors may be further configured to instruct the webserver to dynamically revise the merchant page by displaying at least a portion of the credit card number of the user. The alternative payment option corresponds to an annual percentage rate that satisfies a threshold. The one or more processors are configured to receive the unique identifier from the webserver in response to the webserver determining that the user has a credit card that is associated with the unique identifier.

The alternative payment option is an installment payment option. The attribute of the alternative payment option may correspond to at least one of a monthly amount, a number of installments, or an interest rate. Therefore, the page may display a payment offer that the user's standard purchase rate (APR) or at a reduced APR (e.g., 0%). The first option provides the user the benefits of a predictable repayment schedule with transparent pricing. In some configurations, the analytics server may dynamically revise the page to inform the user that by using said card, they could take advantage of special APR pricing for that purchase.

The merchant page may be a checkout page of a merchant associated with the webserver. The indicator of the credit card of the user may correspond to a partial number of the credit card of the user.

The one or more processors may be configured to select the credit card of the user among a set of credit cards of the user within the user profile based on a promotional offer associated with the selected credit card of the user.

Embodiments in the present disclosure may have one or more of the following advantages. First, some embodiments can provide useful techniques for securely handling a credit card transaction while preventing users from entering credit card information. A system according to some embodiments can utilize mapping between a merchant's program (e.g., loyalty program user identifiers or membership numbers) and account numbers of co-brand credit cards without sharing the card account numbers with a merchant or a merchant-side system.

Second, some embodiments can provide useful techniques for securely handling a credit card transaction while offering additional benefits to cardholders, e.g., providing flexible payment options at point of sale (e.g., at time of checkout). A system according to some embodiments can determine, based on the mapping between the merchant's program and co-brand credit cards, (1) whether at least one co-branded credit card is attached to the program number of the user and (2) whether the at least one co-branded credit card is eligible for a financing offer. Based on the result of the determination, the system can display the financing offer to the user at point of sale (POS), e.g., at time of checkout.

Third, some embodiments can provide useful techniques for implementing a merchant offer sourcing process in a merchant-side system by invoking or calling an API provided by a credit card issuer. This API can enable a lightweight integration between a merchant-side system and a credit card issuer-side system, thereby avoiding a significant data sharing overhead between the systems, e.g., overhead of nightly exchange of files.

Fourth, some embodiments can provide useful techniques for providing payment financing offer details to a user of a merchant-side system not only when the system supports card-on-file (COF) transactions but also when the system does not support COF transactions. In a non-COF scenario, the merchant-side system can display financing offer details to the user when the user enters the matching credit card number.

FIG. 1 illustrates various components of a system 100 for dynamically revising pages with flexible payment options, in accordance with an embodiment. As used herein, a page or pages refer to any electronic page (or graphical user interface) configured to be displayed on one or more electronic devices. For instance, a page may be a webpage configured to display data via browser application. In another example, a page may refer to a graphical user interface presented by an application executing on a mobile device. The system 100 provides a non-limiting example of a computer system having various features that can be utilized to dynamically revise one or more pages with flexible payment options. The system 100 may be utilized by third party webserver (e.g., webserver 120) to incorporate graphical elements generated by the analytics server 141. In some configurations, the graphical elements generated by the analytics server 141 may be incorporated into one or more pages hosted by the webserver 120. In other configurations, the graphical elements generated by the analytics server 141 may be directly displayed onto the end users' computing devices (e.g., user-computing device 110).

The system 100 may include an analytics server 141, webserver 120, database 130, and user-computing device 110. These features may communicate with each other over a network 150. The network 150 may include, but is not limited to, private or public local area network, wireless local area network, metropolitan area network, wide-area network, and the Internet. The network 150 may further include both wired and wireless communications according to one or more standards via one or more transport mediums. The communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for global evolution network.

The system 100 may operate in a local computing environment where the user-computing device 110 may execute an application to access an electronic platform generated/hosted by the webserver 120. An example of an electronic platform may be a website accessible through a browser application. For instance, the user-computing device 110 may execute a browser application and access a website hosted by the webserver 120. Even though some embodiments described herein focus on a website hosted by the webserver, the methods and systems described herein are not limited to websites. For instance, the webserver may also host/generate an application accessible by the user-computing device 110 (e.g., internal application native to an organization where an employee operating the user-computing device 110 may access or a mobile application accessed by the user-computing device 110). The methods and systems described herein apply to generating various graphical elements that are customized to a user operating the user-computing device 110. These graphical elements may be embedded into other graphical elements and/or applications, such as embedded within a website or any other application.

The system 100 may operate in a cloud-computing environment where the user-computing device 110 may be cloud-optimized. The user-computing device 110 data may execute the browser application and access graphical user interfaces and elements generated by the analytics server 141. The graphical user interfaces and elements generated by the analytics server 141 (e.g., services provided by the analytics server 141) may be stored and executed on a remote cloud-based analytics server 141 accessed over a network cloud. In the cloud-computing environment, a web browser on the user-computing device 110 may interface with an application program associated with the analytics server 141, which is executed remotely via cloud-based technology.

The analytics server 141 may be any computing device capable of performing the actions described herein. For instance, the analytics server 141 may include a processing unit, and a non-transitory machine-readable storage medium. The processing unit may include a processor with a computer-readable medium, such as a random access memory coupled to the processor. The analytics server 141 may be executing algorithms or computer executable program instructions, which may be executed by a single processor or multiple processors in a distributed configuration. The analytics server 141 may be configured to interact with one or more software modules of a same or a different type operating within the system 100.

Non-limiting examples of the processor may include a microprocessor, an application specific integrated circuit, and a field programmable object array, among others. The analytics server 141 is capable of executing data processing tasks, data analysis tasks, and valuation tasks. Non-limiting examples of the analytics server 141 may include a desktop computer, a server computer, a laptop computer, a tablet computer, and the like. For ease of explanation, FIG. 1 depicts a single server computing device functioning as the analytics server 141. However, some embodiments may include a plurality of server computing devices capable of performing various tasks described herein.

The analytics server 141 may utilize a database, such as the database 142, to store and/or retrieve various data described herein. For instance, the analytics server 141 may store different data corresponding to different payment options and payment attributes (e.g., number of installments, annual percentage rates of loans, and other terms and conditions) within the database 142. The database 142 may also include data associated with the user operating the user-computing device 110. The database 142 may also include customer information, such as customer's personally identifiable information (e.g., name, age, and other demographic data), payment information (e.g., card numbers or other unique identifiers associated with customer's payment card and other payment information), and program information associated with customers (e.g., name and partner (merchant) of loyalty programs, loyalty program membership numbers (or loyalty program numbers) associated with customers, co-brand credit card information associated with loyalty program numbers). The analytics server 141 may also retrieve data (e.g., demographic and/or financial) data associated with the user requesting the electronic form. For instance, the database 142 may include user data (e.g., previously populated by the analytics server 141 and/or periodically retrieved from a third-party data source).

The analytics server 141 and the database 142 may represent a secondary organization's server and database. The secondary organization 140 may be an organization offering dynamic revisions of pages (e.g., checkout pages) for the webserver 120. An example of the secondary organization 140 may include a financial institution, such as a bank. In a non-limiting example, the webserver 120 may generate/host a website for a merchant offering products and services. The analytics server 141 may utilize the methods and systems described herein to revise the merchant's page and display customized payment information accordingly.

The analytics server 141 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 100. Using different APIs, the analytics server 141 may automatically transmit and/or receive calls and instruction. For instance, the analytics server 141 may use API 121 to communicate with the webserver 120, such that when a user operating the user-computing device 110 requests a particular purchase, the API 121 automatically transmits an instruction to the analytics server 141. The instruction may include data needed for the analytics server 141 to generate and display the graphical elements described herein. The analytics server 141 may also use the API 131 to communicate with the database 130.

The API 131 and/or 121 may be two-way APIs. A two way API refers to an API that allows information to be transmitted back and forth between at least two features of the system 100. For instance, when a user operating the user computing device 110 requests a purchase via a website hosted by the webserver 120, the API 121 may generate a call instructing the analytics server 141 to analyze the data and display customer-specific payment information accordingly. The call may include data associated with the user requesting the purchase.

The analytics server 141 may also use the API 121 to transmit a second call to the webserver 120. The second call may include instructions to display the generated graphical elements (e.g., software code defining the graphical elements and instructing the webserver 120 to embed the graphical elements within one or more pages). As the webserver 120 displays the graphical elements, the analytics server 141 may use the API 121 to receive user inputs. The analytics server may similarly use a two-way API to communicate with the database 130.

Additionally or alternatively, the analytics server may use a content delivery network (CDN) to ensure data integrity when communicating with different features described in the system 100. A CDN, as described herein, refers to a distributed delivery network of proxy servers/nodes that uses multi-layered delivery methods/systems to transmit data (e.g., Akamai). The analytics server 141 may use a CDN when communicating various calls/instructions with the webserver 120 (directly or via the API 121) and/or the database 130 (directly or via the API 131).

The webserver 120 may be a computing device hosting a website (or any other electronic platform) accessible to the user-computing device 110 via the network 150. The webserver 120 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 120 may include workstation computers, laptop computers, server computers, laptop computers, and the like. While the system 100 includes a single webserver 120, the webserver 120 may include a number of computing devices operating in a distributed computing environment.

The webserver 120 may be executing algorithms or computer executable program instructions, which may be executed by a single processor or multiple processors in a distributed configuration. The webserver 120 may be configured to interact with one or more software modules of a same or a different type operating within the system 100. For instance, the webserver 120 may execute software applications configured to host an electronic platform, which may generate and serve various pages to the user-computing device 110. The electronic platform may also embed various graphical user interfaces generated by the analytics server 141.

The webserver 120 may execute software applications configured to display the user interfaces described herein (e.g., host a website that displays graphical user interfaces and other graphical elements generated by the analytics server 141), which may generate and serve various pages to user-computing device 110. The analytics server 141 and/or the webserver 120 may be configured to require user authentication based upon a set of user authorization credentials (e.g., usernames, passwords, biometrics, cryptographic certificates, and the like). In such implementations, the analytics server 141 and/or the webserver 120 may access a system database (e.g., database 130) configured to store user credentials, which the analytics server 141 and/or the webserver 120 may be configured to reference in order to determine whether a set of entered credentials (purportedly authenticating the user) match an appropriate set of credentials that identify and authenticate the user.

The analytics server 141 and/or the webserver 120 may generate and host pages onto the user-computing device 110 based upon a user's role within the system 100. In such implementations, the user's role may be defined by data fields and input fields in user records stored in the database 130. The analytics server 141 and/or the webserver 120 may authenticate the user and may identify the user's role by executing an access directory protocol (e.g., Lightweight Directory Access Protocol (LDAP)). In addition to authenticating a user, the analytics server 141 and/or the webserver 120 may identify a profile associated with the user and analyze the data, such that the graphical elements are customized for each user.

The webserver 120 may generate and serve pages to the user-computing device 110 based upon information associated with the user and structure of the interactive graphical elements of the user-computing device 110. The information associated with the user may be defined by data fields in user records stored in the local memory or database, such as the database 142 and/or database 130.

The user-computing device 110 is a computing device including a processing unit. The processing unit may execute a valuation software application or a web browser application that accesses or receives data records from the database 130. The processing unit may include a processor with computer-readable medium, such as a random access memory coupled to the processor. The user-computing device 110 may be running algorithms or computer executable program instructions, which may be executed by a single processor or multiple processors in a distributed configuration. The user-computing device 110 may interact with one or more software modules of a same or a different type operating within the system 100.

Non-limiting examples of the processor may include a microprocessor, an application specific integrated circuit, and a field programmable object array, among others. Non-limiting examples of the user-computing device 110 may include a server computer, a workstation computer, a tablet device, and a mobile device (e.g., smartphone, PDA). An end user (inputting the data or filling out the electronic form) may operate the user-computing device 110. The user may be a client of a financial company. For ease of explanation, FIG. 1 illustrates a single computing device functioning as the user-computing device 110. However, some embodiments may include a plurality of computing devices capable of performing the tasks described herein.

The database 130 associated with the analytics server 141, the webserver 120, the data sources 102, and the user-computing device 110 is capable of storing information in various formats and/or encrypted versions. The information may include data records associated with various companies utilizing the webserver 120, data records associated with the webserver 120, and data records associated with different users (e.g., customer profiles having personally identifiable information, financial information, and any other information necessary to determine a customized financing option for the user). The database 130 may also store data associated with user preferences, attributes associated with various graphical elements to be generated by the analytics server 141, and the like. The database 130 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 130 is shown as a separate computing feature, the database 130 may be a part of a computing environment that includes the webserver 120. For instance, the database 130 and the webserver 120 may belong to a merchant computing environment where the webserver 120 retrieves merchant data from the database 130 to host a website.

Utilizing the web browser executing on the user-computing device 110, a user may generate a request that can be transmitted to the analytics server 141 and/or the webserver 120.

Specifically, the user may request to fill out an electronic form and submit the form using a website generated by the webserver 120. As a result, the webserver 120 may instruct the analytics server 141 to generate a chat-like intelligent data input form to collect the user's information. The request may also include data associated with the user (e.g., demographic data and/or user preferences) and data associated with the user's request (e.g., purchase price).

The analytics server 141 may then generate various graphical user interfaces and graphical elements that represent customized payment information for the user operating the user-computing device 110. The analytics server 141 may then generate various interactive graphical user interfaces and elements and may instruct the webserver 120 to incorporate the generated graphical user interfaces and elements within the website displayed on the user-computing device 110. The analytics server 141 and/or webserver 120 may display the graphical user interfaces and elements generated by the analytics server 141 in a manner that is indistinguishable from the website hosted by the webserver 120. For instance, the graphical user interfaces and elements generated by the analytics server 141 may be implemented/embedded within the website generated/hosted by the webserver 120, such that they share the same look and feel. In this way, the user is not directed to a new page and the interaction with the flexible payment options is seamless.

The analytics server 141 and/or webserver 120 may monitor the user's interactions with the graphical user interfaces and elements generated by the analytics server 141. For instance, the analytics server 141 and/or the webserver 120 may record data inputted by the user and may transmit the recorded data (e.g., a submitted application) to another server for processing. For instance, the analytics server may determine which payment option was selected by the user and may transmit the selection to another server to facilitate the transaction.

In operation, the analytics server 141 may provide a pluggable software component to be installed and executed by a merchant utilizing the webserver 120 to host a merchant website. Upon installation, a system administrator may configure the pluggable component using various preferences and defined criteria. For instance, the system administrator may customize the pluggable component, such that graphical elements and components have the same look and feel of the merchant's website. Additionally, the system administrator may customize the locations of the elements to be displayed by the pluggable component.

A pluggable component (also known as a plug-in) may be a software component that adds a specific feature to an existing computer program utilized and executed by the webserver 120. The analytics server 141 may provide services discussed herein via the pluggable component. The analytics server may implement plug-in functionality using shared libraries that get dynamically loaded at run time and installed in a place prescribed by the host application (e.g., stored within the database 142 and/or 130). The pluggable component may be in direct communication with the analytics server 141, such that the analytics server 141 can determine whether the user/customer has requested alternative payment options (e.g., installment payment options). The analytics server 141 can also display various graphical elements and components discussed herein using the pluggable component. In this way, the analytics server 141 can instruct the webserver 120 to display different components within the merchant website.

After the initial setup, the webserver 120 can continue hosting the merchant website. When a user reaches a defined page (e.g., a checkout page), the pluggable component may gather user data and transmit a notification to the analytics server 141. The pluggable component may first request an authorization from the webserver 120 before interacting with the user or displaying any data. For instance, the pluggable component may transmit a token (GetAccessToken command) to the webserver 120 or a merchant server. Using the token, the webserver 120 may authenticate the analytics server 141 and authorize it to display the graphical component discussed herein. Upon a successful authorization, the pluggable component may then transmit a command to the webserver 120 (GetCustomerAccountInfo). In this way, the pluggable component may transmit a unique identifier of the user. For instance, the user's credit card number is not transmitted. Instead, the last four digits may be transmitted. In another example, a portion of the user's loyalty program number may be transmitted back to the analytics server. The analytics server 141 may then use the user's unique identifier to identify a customer profile within the database 142 (or database 130) and retrieve data associated with the user. Based on the retrieved data, the analytics server 141 (or a third party server) may generate installment payment options for the user and may utilize the pluggable component to display various graphical elements and components representing those options.

After receiving a selection from the user, the analytics server 141 may transmit the selection and other transaction data (e.g., purchase price) to a secondary server 160. The secondary server 160 may then facilitate the transaction by transmitting a monetary amount (e.g., purchase price) to an account of the merchant. Even though the analytics server 141 and the secondary server 160 are shown as two separate servers, the functionality attributed to the secondary server 160 may be performed by the analytics server 141. For instance, the analytics server 141 may display installment payment options, receive a selection, and facilitate the transaction by transmitting the purchase price to a merchant account. The analytics server 141 may then revise a data record within the database 142 and/or 130 recording the user's new debt obligation.

Figure 2:
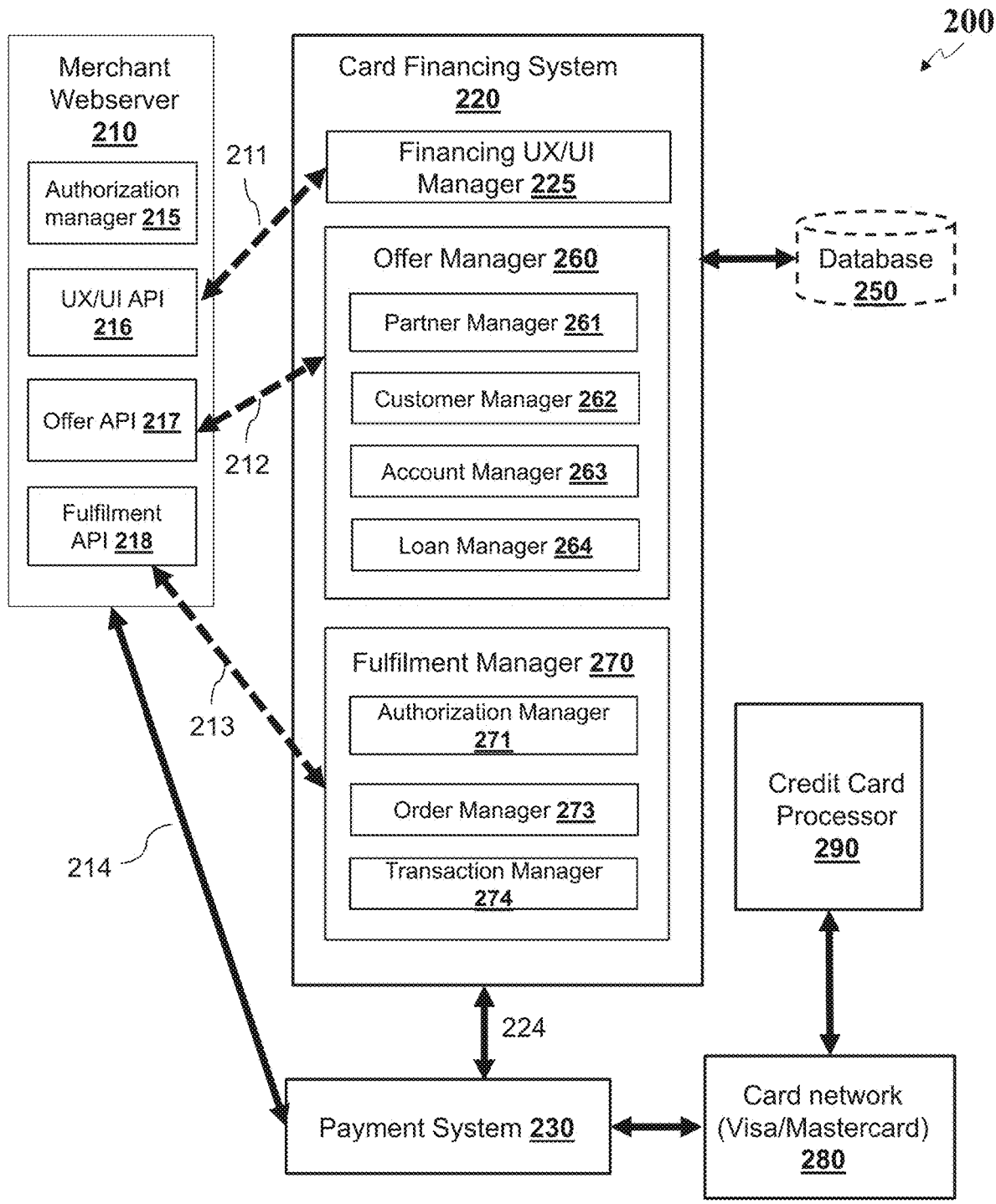
FIG. 2 illustrates a block diagram of a payment financing system, according to an embodiment.

FIG. 2 illustrates a block diagram of a payment financing system 200 including a card financing system 220 associated with a credit card issuer, a merchant webserver 210 and one or more databases 250, according to an embodiment. The card financing system 220 may be implemented with analytics server 141 in FIG. 1. The webserver 210 may be implemented with webserver 120 in FIG. 1. The databases 250 may be implemented with database 142 and/or database 130. The card financing system 220 may process a point-of-sale (POS) transaction via a payment server 230 by transmitting monetary information 224 (e.g., purchase price) to a merchant account in (external) bank systems and/or a credit card processor 290. Similarly, the webserver 210 may process a POS transaction via the payment server 230 (without interacting with the card financing system) by transmitting monetary information 224 to the credit card processor 290, for example, when a customer uses a payment method other than a credit card associated with the card financing system 220. The payment server 230 may be implemented with secondary server 160 in FIG. 1.

Each of the webserver 210 and card financing system 220 may retrieve/access/read data from the databases 250 and/or update/add/write data to the databases 250. For example, the databases 250 may include (1) customer information, such as customer's personally identifiable information (e.g., name, age, and other demographic data), (2) payment information (e.g., card numbers or other unique identifiers associated with customer's payment card and other payment information), and/or (3) program information associated with customers, such as name and partner (merchant) of programs, program membership numbers (or program numbers) associated with customers, co-brand credit card information associated with program numbers, etc.

The card financing system 220 may include a financing user experience (UX)/user interface (UI) manager 225, an offer manager 260 and a fulfillment manager 270, each of which may be a software module executable by a processor (e.g., CPU) with memory (e.g., RAM) of the card financing system 220. The financing UX/UI manager 225, the offer manager 260 and the fulfilment manager 270 may be provided by the card financing system 220 via pluggable components to be executable by the webserver 210.

The UX/UI manager 225 may be configured to implement a process to generate various graphical user interfaces and graphical elements that represent payment financing offers (e.g., installment payment options) for a user browsing a web page from the webserver 210. The UX/UI manager 225 may generate various interactive graphical user interfaces and elements and may instruct the webserver 210 to incorporate the generated graphical user interfaces and elements within the website displayed on a user-computing device (e.g., user-computing device 110 in FIG. 1). The card financing system 220 and/or webserver 210 may display the graphical user interfaces and elements generated by the card financing system 220 in a manner that is indistinguishable from the website hosted by the webserver 210. In this way, the user is not directed to a new page and the interaction with the payment financing options is seamless.

The offer manager 260 may be configured to implement a process to generate financing offers (e.g., payment financing installment options) for a logged-in customer. The offer manager 260 may include a plurality of submodules—e.g., partner manager 261, customer manager 262, account manager 263, and/or loan manager 264. The partner manager 261 may be configured to manage partner information relating to programs and/or co-branded credit cards. For example, the partner manager 261 may access the databases 250 to manage partner information such as (1) name and partner (merchant) of programs, (2) program membership numbers (or program numbers) associated with customers, and/or (3) co-brand credit card information associated with program numbers. The customer manager 262 may be configured to manage user or customer profile information. For example, the customer manager 262 may access the databases 250 to manage customer information, such as a customer's personally identifiable information (e.g., name, age, identifier, and other demographic data). The account manager 263 may be configured to manage payment or account information. For example, the account manager 263 may access the databases 250 to manage payment or account information such as (1) card numbers or other unique identifiers associated with a customer's payment card and (2) other payment information. The loan manager 264 may be configured to manage loan or financing offer information based on the payment or account information associated with customers. For example, the loan manager 264 may access the databases 250 to manage loan or financing offer information such as loan amount, loan rate (e.g., annual percentage rate (APR)), loan term or duration, and other loan or offer information. The offer manager 260 may be configured to generate payment financing offers (e.g., installment payment options) for a particular customer based on information on partner's programs, customer information, the payment or account information, and loan information, which are associated with the particular customer.

The fulfillment manager 270 may be configured to implement a process to complete a POS transaction. The fulfillment manager 270 may include a plurality of submodules—e.g., (loan) authorization manager 271, loan manager 272, (card) product manager 273, and/or transaction manager 274. The authorization manager 271 may be configured to manage loan authorization information relating to payment financing offers generated by the offer manger 260. For example, the authorization manager 271 may access the databases 250 to manage loan authorization information such as authorization amount, authorization date, authorization code, and etc. The order manager 273 may be configured to manage order information relating to a POS order by a customer. For example, the order manager 273 may access the databases 250 to manage order information such as purchase item information, number of items, price of each item, etc. The transaction manager 274 may be configured to manage transaction information relating to POS orders. For example, the transaction manager 274 may access the databases 250 to manage transaction information such as total purchase price, transaction date and time, etc. The fulfillment manager 270 may be configured to complete a POS transaction based on payment financing offers generated by the offer manager 260, authorization information, order information, and/or transaction information.

The webserver 210 may include an authorization manager 215, a user experience (UX)/user interface (UI) API 216, an offer API 217, and a fulfillment API 218, each of which may be a software module executable by a processor (e.g., CPU) with memory (e.g., RAM) of the webserver 210. The authorization manager 215 may be configured to implement an authorization process to authorize the card financing system 220 to display graphical components on a website hosted by the webserver 210. When a user reaches a defined page (e.g., a checkout page), a pluggable component may first request an authorization from the webserver 210 before interacting with the user or displaying any data. The authorization manager 215 may authorize or accept the request so that the pluggable component may transmit a token to the webserver 210. Using the token, the webserver 210 may authenticate the card financing system 220 and authorize it to display the graphical components on a web page.

The UX/UI API 216 may be configured to be invoked 211 to execute the financing UX/UI manger 225 to generate various graphical user interfaces and graphical elements that represent payment financing offers. For example, when a user reaches a defined page (e.g., purchase item summary page or order checkout page), the webserver 210 may invoke 211 the financing UX/UI manager 225 via the UX/UI API 261 so as to receive 211 and display graphical user interfaces and/or graphical elements representing payment financing offers generated by the offer manager 260.

The payment financing system 200 may perform or achieve financing offer extension and fulfillment via (digital) APIs provided by a credit card issuer, such as offer API 217 and fulfilment API 218. The offer API 217 may be configured to be invoked to execute the offer manager 260 to generate financing offers (e.g., payment financing installment options) for a logged-in customer. Table 1 shows parameters or return values of an offer API as a two-way API. As shown in Table 1, the webserver may invoke 212 the offer API 217 with at least one parameter of a customer identifier (e.g., loyalty program number of a logged-in customer) and/or a financing amount (e.g., a total purchase amount). In response, the card financing system 220 may return at least one return value 212 of partner identification information, customer identification information, loan or financing information (e.g., amount, rate, term, duration, installment amount), or credit card information (e.g., last 4 digits of account number, encrypted account number, name and product of credit card).

TABLE 1

Offer API

| From Webserver to Card Financing System | From Card Financing System to Webserver |
| --- | --- |
| Customer identifier<br>Financing amount | Partner identifier<br>Partner screen identifier<br>Customer identifier type<br>Customer identifier value<br>Loan amount to be financed<br>Offer identifier<br>Last 4 digits of account number<br>SHA-256 hash value of account number<br>Card name<br>Product identifier<br>Loan rate (APR)<br>Best offer indicator<br>Loan term identifier<br>Loan duration<br>Installment amount |

The fulfillment API 218 may be configured to be invoked 213 to execute the fulfilment manager 270 to complete a point-of-sale (POS) transaction. Table 2 shows parameters or return values of a fulfillment API as a two-way API. As shown in Table 2, the webserver may invoke 213 the fulfillment API 218 with at least one parameter of transaction information (e.g., total amount, transaction date), loan authorization information (e.g., authorization code, authorization date, authorization amount), credit card information (e.g., last 4 digits of account number), loan or financing information (e.g., loan term, loan duration, installment amount), order information (e.g., in case of airline merchant, reservation itinerary, passenger information, or number and price of tickets). In response, the card financing system 220 may return a status code 213 indicating whether the requested transaction is completed or fulfilled.

TABLE 2

Fulfillment API

| From Vendor to Card Company | From Card Company to Vendor |
| --- | --- |
| Transaction identifier | Status code |
| Authorization code | |
| Authorization date | |
| Authorization amount | |
| Last 4 digits of account number | |
| Offer identifier (20 bytes) | |
| Loan term identifier | |
| Loan duration | |
| Loan installment amount | |
| Reservation itinerary | |
| Passenger name record (PNR) - reservation locator | |
| Total ticket count | |
| Ticket number | |
| Passenger first name | |
| Passenger last name | |
| Ticket amount | |
| Transaction date | |

Referring to FIG. 2, the payment financing system 200 may utilize mapping between a merchant's program (e.g., loyalty program user identifiers or membership numbers) and card numbers of co-brand credit cards. Such mapping information may be stored in the databases 250. The merchant webserver 210 may identify or determine program membership numbers (or program numbers) for logged-in customers on the merchant's website which in turn can be mapped to eligible card numbers of co-brand cards by the card financing system 220. The merchant webserver 210 may determine the program numbers to credit card numbers mapping by invoking an API of the credit card issuer (e.g., offer API 217).

The payment financing system 200 may use such mapping between program numbers to credit card numbers to allow the merchant website 210 to display graphical user interfaces and/or graphical elements representing user-specific and/or card-specific financing offers on a web page. In providing such financing offers on the merchant's website, it is possible that the account numbers (credit card numbers) of a credit card issuer (e.g., data stored in databases 250) may not be shared with the merchant webserver. The graphical user interfaces and/or graphical elements representing user-specific and/or card-specific financing offers may be referred to as an awareness banner (or awareness placement). The payment financing system can use the awareness banner to promote the merchant-card issuer co-branded card products through attractive financing offers before the user enters the credit card account number or even without need of such account number entry, thus can influence choice of account and/or card used. In this approach, it is possible that the payment financing system does not require sharing of account numbers for the merchant webserver to render user-specific and/or card-specific offers on its web page.

The payment financing system 200 may implement an awareness banner (or awareness placement) using an API provided by the credit card issuer and callable by the merchant webserver (e.g., UX/UI API 215, Offer API 217). The merchant webserver 210 can invoke or call the API to establish or determine the program numbers (or identifiers) to credit card numbers mapping at an account acquisition time. In this manner, card numbers do not need to be shared with the merchant webserver.

The payment financing system 200 can extend or offer or provide a point-of-sale (POS) payment financing to a merchant webserver 210 when a user purchases an item from the merchant website. For example, a user who is associated with a program number can login to the merchant website 210, browse product web pages for purchase of a product item, and then see flexible payment financing options on a checkout page (e.g., a checkout page) on the merchant website.

The payment financing system 200 can process or handle card-on-file (COF) transactions in which pre-stored credit card information can be used for processing a transaction (referred to as "COF scenario"). After a user logins to the merchant website hosted by the webserver 210 and browse product web pages for purchase of a product item, the webserver 210 may display financing terms and determine whether a co-branded credit card of the user is eligible for financing by invoking an API provided by the card issuer (e.g., offer API 217). In response to determining that the co-branded credit card is eligible, the webserver 210 or card financing system 220 may determine whether the eligible co-branded credit card is a default COF. In response to determining that the eligible co-branded credit card is the default COF, the webserver 210 or card financing system 220 may automatically display offered financing details (e.g., flexible payment options or installment payment options) on a checkout page (e.g., a checkout page). In response to determining that the eligible co-branded credit card is not the default COF, the system may display an awareness placement (or awareness banner) prompting the user to enter the account number of the eligible co-branded credit card to see the offer details. After the user enters an account number, the system (e.g., card financing system 220) may compare the user-entered account number with the correct account number of the eligible co-branded credit card. In response to determining that the user-entered account number matches the correct account, the system may display details of a financing offer.

The payment financing system 200 does not process or handle card-on-file (COF) transactions (referred to as "non-COF scenario"). After a user associated with a program number logins to the merchant website (hosted by the merchant webserver 210) and browse product web pages for purchase of a product item, the webserver 210 (or card financing system 220) may display financing terms, determine the program numbers (or identifiers) to credit card numbers mapping, and determine, based on the mapping, whether a co-branded credit card of the user is eligible for financing. These processes may be executed by invoking an API provided by the card issuer, e.g., offer API 217). In response to determining that the co-branded credit card is eligible, the system (e.g., webserver 210 or financing system 220) may display an awareness placement (or awareness banner) prompting the user to enter the account number of the eligible co-branded credit card to see the offer details.

After the user enters an account number, the system may compare the user-entered account number with the correct account number of the eligible co-branded credit card. In response to determining that the user-entered account number matches the correct account, the system (e.g., webserver 210 or financing system 220) may display details of a financing offer (e.g., installment payment options; see FIG. 3). In this manner, when the system does not support COF transactions, financing offer can be only available to logged-in co-brand cardholders on the merchant website and/or merchant mobile application (or mobile app) if the cardholders enter the correct account number of their co-branded credit cards. The webserver may identify or display, in their website, an eligible co-branded credit card with (1) a product name of a co-branded credit card (e.g., platinum/executive card) and (2) partial information (e.g., last 4 digits) of the account number of the co-branded credit card. In displaying the details of a financing offer, the system (e.g., webserver 210 or card financing system 220) may open up a web page in an accordion-style to display a financing section which includes the financing offer.

For example, referring to FIG. 2, in a non-COF scenario, using an airline company as an example merchant which has a co-brand credit card with a partner credit card issuer, users can log into a website of the merchant (e.g., webserver 210). The merchant may run a program using program numbers associated with its customers. Before a web page and/or a mobile screen is rendered to a user, a merchant-side system (e.g., webserver 210) can pass a program number associated with that user to a credit card issuer-side system (card financing system 220) through an API (e.g., offer API 217). The card-issuer side system can then use the program number to locate or identify co-brand credit card account(s) connected to (or associated with) that program number through the existing mapping used for mileage accumulations, etc., which are stored in databases (e.g., databases 250). The card issuer-side system can locate or identify financing offers on those accounts and return user-specific and/or account-specific information (e.g., user-specific and/or account-specific payment options) to the merchant-side system without revealing the credit card account number. The merchant-side system can use this user-specific and/or account-specific information to create or generate a personalized offer (known as an awareness banner or an awareness placement) using interactive graphical elements (e.g., web page or web UI (user interface) or web UX (user experience)), prompting the user to enter the account number to see the offer details. The merchant-side system may display financing offer details when the user enters the matching card number.

Figure 5:

Referring now to FIGS. 3-5, non-limiting examples of the graphical user interfaces and elements described herein are illustrated. Even though FIGS. 3-5 illustrate a progression in sequential graphical user interfaces, in some configurations the analytics server (or card financing system) may display the depicted graphical user interfaces in another order. Moreover, the analytics server may not display one or more of the graphical elements described herein. The analytics server may display various combinations and configurations of the graphical user interfaces depicted herein.

The graphical user interfaces depicted in FIGS. 3 to 5 illustrate one or more graphical elements displayed by the analytics server 141 (or card financing system 220) through a webserver 120 (or webserver 210), as described in FIG. 1 and FIG. 2. For instance, a user may log into a merchant website and request various services where a webserver associated with the website (e.g., the host for the website) may communicate the information to the analytics server. The analytics server may in turn display the graphical elements depicted herein using the "look and feel" of the third-party website (e.g., as a white-labeled page). Therefore, the user may not be required to leave for a third-party website and/or initiate a new page generated by the analytics server. In some configurations, however, the user may be directed to a new website where the analytics server displays the graphical user interfaces and elements discussed herein. For instance, the analytics server may require additional information from the user. As a result, the analytics server (or the webserver) may direct the user to a new page, such that the user is presented additional prompts to input additional data (e.g., social security data or other payment information).

As depicted in FIG. 3, an end-user may initiate a web browser on an electronic device, such as their mobile device and direct the web browser to a website configured to purchase a product (e.g., airline tickets as shown in FIG. 3) in a COF scenario in which pre-stored credit card information can be used for processing a transaction. After selecting the product, the webserver directs the user to a checkout page 300 (e.g., checkout page as shown in FIG. 3). At this time, a payment financing system (analytics server or webserver) may determine whether a co-branded credit card associated with the end-user is eligible for a payment financing offer. In response to determining that the co-branded credit card is eligible, the system may determine whether the eligible co-branded credit card is a default COF. In response to determining that the eligible co-branded credit card is the default COF, the system may automatically display offered financing details (e.g., installment payment options 311) on the checkout page.

The checkout page 300 may include graphical components 302, 304 that display various information associated with the transaction, such as product or order information 302 and price or cost information 304.

The checkout page 300 may include the graphical element 306 presenting the user various payment options. These options may include credit card on file (COF) 307, credit card 308, other form of payment 309 (e.g., electronic fund transfer between individuals or businesses), and/or hold 310 (e.g., debit card hold). If the user select an option other than the COF option 306, the system may not automatically display installment options. If the user select the COF option 306, as described above, the system may determine (1) whether the co-branded credit card is eligible and (2) whether the eligible co-branded credit card is the default COF. In response to determining that (1) the co-branded credit card is eligible and (2) the eligible co-branded credit card is the default COF, the system may automatically display an interactive graphical element (installment payment options) 311 that provides the user the option to pay for the transaction via an installment payment option (e.g., purchase the product via monthly installments). In displaying the installment payment options, the system (e.g., webserver or analytics server) may open up a web page in an accordion-style to display a financing section which including the installment payment options. The system may identify installment payment options with a product name 321 of the co-branded credit card (e.g., "platinum/executive card") and partial information 323 (e.g., last 4-digits) of the co-branded credit card, and display details of the financing offer in the installment payment options 311.

The installment payment options 311 may include four alternative payments calculated by the analytics server to facilitate the pending transaction. Each installment payment option may include different attributes. For instance, the first graphical component 312 may indicate a first option that comprises payment of the total amount in full without installments. The second graphical component 313 may indicate a first installment payment option that comprises installments of $47/month for 9 months. The first installment payment option also includes a 5.99% APR. The graphical component 314 may indicate a second installment payment option that comprises installments of $62/month for 6 months. The second installment payment option also includes a 5.99% APR. The graphical component 315 may indicate a third installment payment option that comprises installments of $117/month for 3 months. The third installment payment option also includes a 5.99% APR.

The webserver may identify the analytics server when the webserver determines that the user has interacted with the interactive graphical component 311. For instance, the webserver may utilize one or more APIs (e.g., UX/UI API 216 in FIG. 2) to transmit a notification to the analytics server. Additionally or alternatively, the webserver may execute a pluggable component (e.g., software script) that is in communication with the analytics server. The pluggable component may transmit the notification directly to the analytics server.

The notification may include information associated with the transaction, such as the item to be purchased, price, vendor, delivery date, and other transaction data needed to identify an installment payment option. The notification may include a unique identifier associated with the user. For instance, the user may be associated with a program of the merchant. In those embodiments, the notification may include the user's program identifier or number as a unique identifier.

Additionally or alternatively, the notification may include a unique identifier associated with the user. For instance, the notification may include a name, account number, or other personally identifiable information associated with the user (e.g., social security number).

Using the information within the notifications, the analytics server may identify a customer profile associated with the user. For instance, the analytics server may query and retrieve a customer profile using the credit card information associated with the user (or other personally identifiable information included within the notification). The analytics server may determine that the user is an existing customer (e.g., has an active account with a financial institution associated with the analytics server). The analytics server may retrieve various personal and financial data included within the customer profile.

Using the transaction data and the user data retrieved from the customer profile, the analytics server (or another server under direction of the analytics server) may calculate various installment payment options for the user. For instance, based on the credit worthiness of the user and the purchase price, the analytics server may generate three alternative installment plans for the user and the pending transaction (e.g., three installment plans 313, 314, 315 in FIG. 3).

As depicted in FIG. 4, an end-user may initiate a web browser on an electronic device, such as their mobile device and direct the web browser to a website configured to purchase a product in a non-COF scenario in which a payment financing system does not process or handle card-on-file (COF) transactions. A user associated with a program number logins to the merchant website (e.g., a website hosted by a merchant webserver) and browses product web pages for purchase of a product item. After selecting the product, the webserver directs the user to a checkout page 400. At this time, a payment financing system (e.g., analytics server) may determine the program numbers (or identifiers) to credit card numbers mapping, and determine, based on the mapping, whether a co-branded credit card of the user is eligible for financing. In response to determining that the co-branded credit card is eligible, the system (e.g., webserver or analytics server) may display an awareness placement (or awareness banner) 420 prompting the user to enter the account number of the eligible co-branded credit card to see the offer details. The awareness placement may identify or display an eligible co-branded credit card with (1) a product name of a co-branded credit card (e.g., platinum/executive card) and (2) partial information (e.g., last 4 digits) of the account number of the co-branded credit card. For example, as shown in FIG. 4, the awareness placement 420 may identify the eligible co-branded credit card with product name 422 ("BB loyalty credit card") and last 4 digits of the card 424 (5496).

After the user enters an account number, the system may compare the user-entered account number with the correct account number of the eligible co-branded credit card. In response to determining that the user-entered account number matches the correct account, the system (e.g., webserver or analytics server) may display details of a financing offer (installment payment options) 440 in a manner similar to that of displaying the installment options 311 in FIG. 3. In this manner, when the system does not support COF transactions, a financing offer can be only available to logged-in co-brand cardholders on the merchant website if the cardholders enter the correct account number of their co-branded credit cards. In displaying the installment payment options 440, the system (e.g., webserver or analytics server) may open up a web page in an accordion-style to display a financing section which may include the installment payment options.

In a non-limiting example, the installment payment options 440 may include four alternative payments calculated by the analytics server to facilitate the pending transaction. In another example, the number of installments (or the number of alternative payments) may depend on various attributes of the transaction. For instance, in another non-limiting example, the system may offer up to 6 installments for larger ticket items.

Each installment payment option may include different attributes. For instance, the first graphical component 441 may indicate a first option that comprises payment of the total amount in full without installments. The second graphical component 442 may indicate a first installment payment option that comprises installments of $47/month for 9 months. The first installment payment option also includes a 5.99% APR. The graphical component 443 may indicate a second installment payment option that comprises installments of $62/month for 6 months. The second installment payment option also includes a 5.99% APR. The graphical component 444 may indicate a third installment payment option that comprises installments of $117/month for 3 months. The third installment payment option also includes a 5.99% APR.

Each graphical component 441-444 may be an interactive component configured to receive a selection by the user interacting with the installment payment option page 400. For instance, the user may select one of the payment options described above by clicking (or otherwise interacting with) the corresponding graphical component. Upon receiving an indication that the user has interacted with a graphical component, the webserver may transmit a notification to the analytics server informing the analytics server that a selection has been made and indicating which graphical component has been interacted with by the user.

After receiving the customer/user's input (e.g., the user's selection of an alternative payment displayed on the checkout page), the analytics server may employ various existing infrastructures to facilitate the financial transaction. For instance, the analytics server may first receive the user's selection of a particular alternative payment. The analytics server may then facilitate the transaction over existing network rails after which the issuer may process the transaction via instructions received. Therefore, communicating the user's selection itself may be a request to initiate a financial transaction facilitated by a card issuer. That is, the analytics server may only transmit a signal to a server associated with the card issuer indicating that the user has selected card No. XXXXX345 to purchase product A for $350. The card issuer may then facilitate the transaction using various methods.

The analytics server may then facilitate the transaction by transmitting the installment payment option selected by the user. For instance, the analytics server may transmit the attributes of the selected installment payment option to a second server where the second server can facilitate the transaction by transmitting the requested funds ($336.00) to an account associated with the merchant. The second server may also generate a new account associated with the newly created financial obligation associated with the user. For instance, if the user selects the second installment payment option 442, the second server may revise one or more data records within one or more databases indicating that the user is now responsible for monthly payments of $47 at a 5.99% APR for 9 months. The analytics server may act as the analytics server and the second server. Therefore, all or at least part of the actions described herein as being performed by the second server may be performed by the analytics server itself.

The analytics server may instruct the webserver (via one or more API or the pluggable component) to direct the user to a payment summary page 500, as depicted in FIG. 5. As depicted in FIG. 5, an end-user may initiate a web browser on an electronic device, such as their mobile device and direct the web browser to a website configured to purchase a product. After the user selects a link to a payment summary page (link not shown), the webserver directs the user to a payment summary page 500. If the user has previously purchased products using credit cards in either scenario of COF (as shown in FIG. 3) or non-COF (as shown in FIG. 4), the payment summary page 500 may include an interactive graphical element 502 for the user to select a card among all cards used in the previous transactions so that the payment summary page only shows installment payment plan(s) or transaction(s) associated with the selected card. Once the user select a card, a system (webserver or analytics server) may display graphical components 504, 506 that respectively display detailed information associated with the installment payment plan 504 and detailed information associated with the transaction 506.

Figure 6:
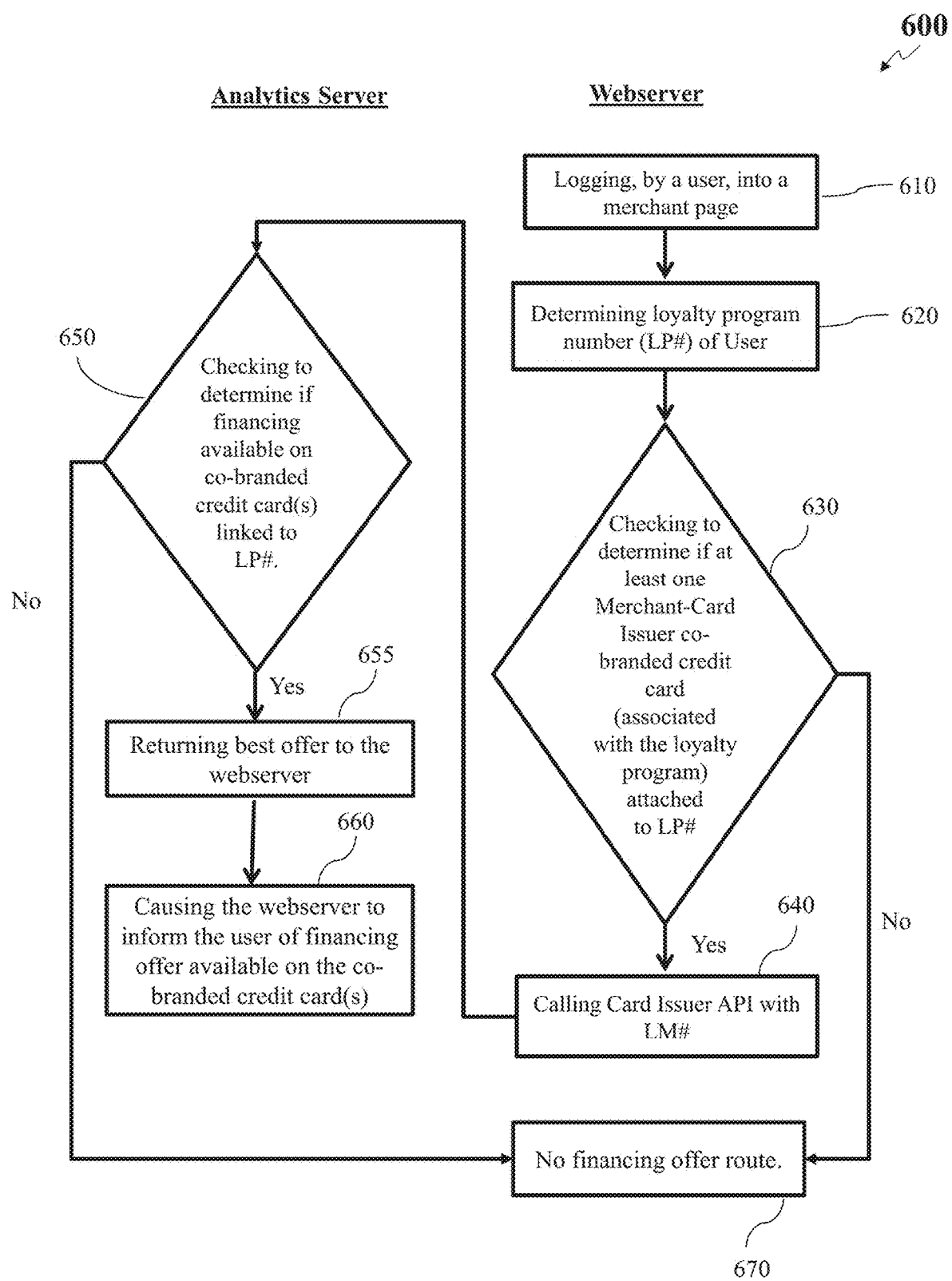
FIG. 6 illustrates a flowchart depicting operational steps for providing financing offers to a user, in accordance with an embodiment.

FIG. 6 illustrates a flowchart depicting operational steps for providing financing offers to a user, in accordance with an embodiment. The method 600 describes how a system (webserver or analytics server) described in FIG. 1 and FIG. 2, provides financing offers to a user. Even though the method 600 is described as being executed by the analytics server, the method 600 can be executed by any server and/or locally within a user's computing device or as a browser extension. Additionally or alternatively, the method 600 can be executed by a webserver acting as both a webserver and the analytics server by hosting the website and generating the graphical elements described herein. Furthermore, other configurations of the method 600 may comprise additional or alternative steps, or may omit one or more steps altogether.

At step 610, a user may log into a merchant website (e.g., a website hosted by webserver 120 or webserver 210).

At step 620, a webserver (or a merchant-side system) may determine an identifier of the user without using personally identifiable information (PPI), for example, a program (membership) number of the user. For example, the program is run by a merchant and is associated with co-branded credit cards of a credit card issuer.

At step 630, the webserver may check to determine if at least one co-branded credit card is attached to the program number. The webserver may perform this checking using user profile data (which may be stored in databases 130, 250) which indicate whether at least one co-branded credit card is associated with the user or the program number. The co-branded credit card may be based on the merchant-card issuer partnership and may be associated with the program. In response to determining that at least one co-branded credit card is not attached to the program number, the webserver may proceed to step 670.

At step 640, in response to determining that at least one co-branded credit card is attached to the program number, the webserver may invoke or call an API (e.g., UX/UI API 216, offer API 217 in FIG. 2) with the program number or a user identifier. The API may be provided by the card issuer. The webserver may invoke the API to execute a software module implemented in a card issuer-side system (e.g., offer manager 260 in FIG. 2).

At step 650, an analytics server (or a credit card issuer-side system) may check to determine if financing is available on the co-branded credit card(s) linked to the program number or the user identifier.

At step 655, in response to determining that financing is available on the co-branded credit card(s) linked to the program number, the analytics server may return best offer(s) to the merchant-side system. The offer(s) may be flexible payment options or installment payment options which may include an amount, rate and/or duration of a loan or installment. In response to determining that financing is not available on the co-branded credit card(s) linked to the program number, the analytics server may proceed to 670.

At step 660, in response to the analytics server determining that financing is available on the co-branded credit card(s) linked to the program number, the analytics server may cause the webserver to inform the user of the returned financing offer(s) available on the co-branded credit card(s). The webserver may display installment options (e.g., installment options 311 in FIG. 3) on a checkout page (e.g., checkout page 300) at point of sale. For example, the webserver may identify the financing offer with a product name of the co-branded credit card (e.g., name 321 in FIG. 3) and partial information (e.g., last 4-digits; number 323 in FIG. 3) of the co-branded credit card, and display details of the financing offer in the installment options.

At step 670, the webserver may inform the user that there is no financing offer available due to no financing offer route, and complete the financing offer process.

Figure 7:
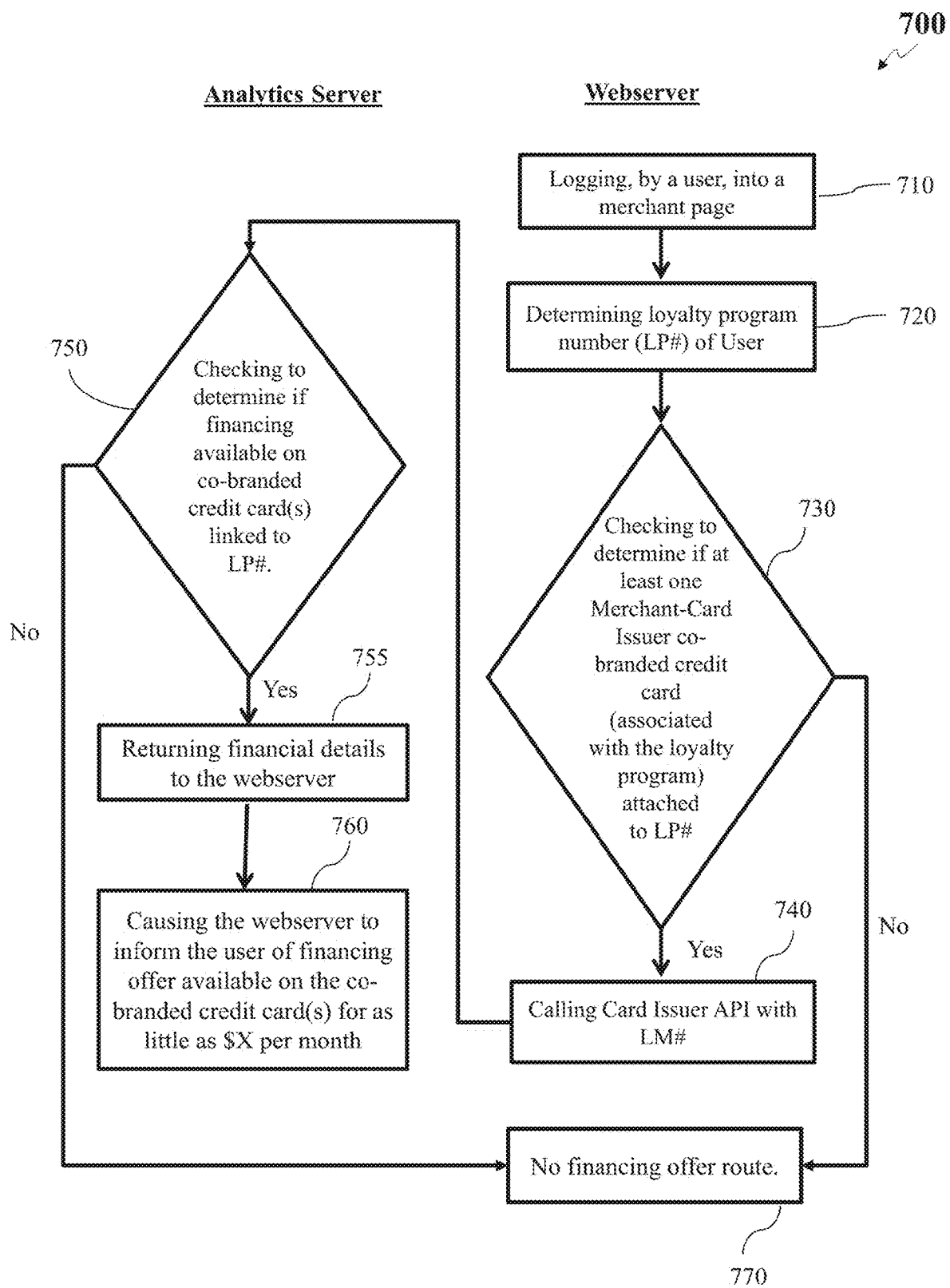
FIG. 7 illustrates a flowchart depicting operational steps for providing financing offers to a user, in accordance with an embodiment.

FIG. 7 illustrates a flowchart depicting operational steps for providing financing offers to a user, in accordance with another embodiment. Webserver-side processing steps 710, 720, 730, 740, 770 may be similar to the webserver-side processing steps 610, 620, 630, 640, 670 (see FIG. 6), respectively.

At step 750, an analytics server (or a credit card issuer-side system) may check to determine if financing is available on the co-branded credit card(s) linked to the program number or the user identifier.

At step 755, in response to determining that financing is available on the co-branded credit card(s) linked to the program number, the analytics server may return financing detail(s) to the merchant-side system. The financing detail(s) may be flexible payment options or installment payment options which may include an amount, rate and/or duration of a loan or installment. In response to determining that financing is not available on the co-branded credit card(s) linked to the program number, the analytics server may proceed to 770.

At step 760, in response to the analytics server determining that financing is available on the co-branded credit card(s) linked to the program number, the analytics server may cause the webserver to inform the user of the returned financing offers(s) available on the co-branded credit card(s). The webserver may display installment options in a format indicating a lowest installment amount (e.g., "for as little as $X per month").

Figure 8:
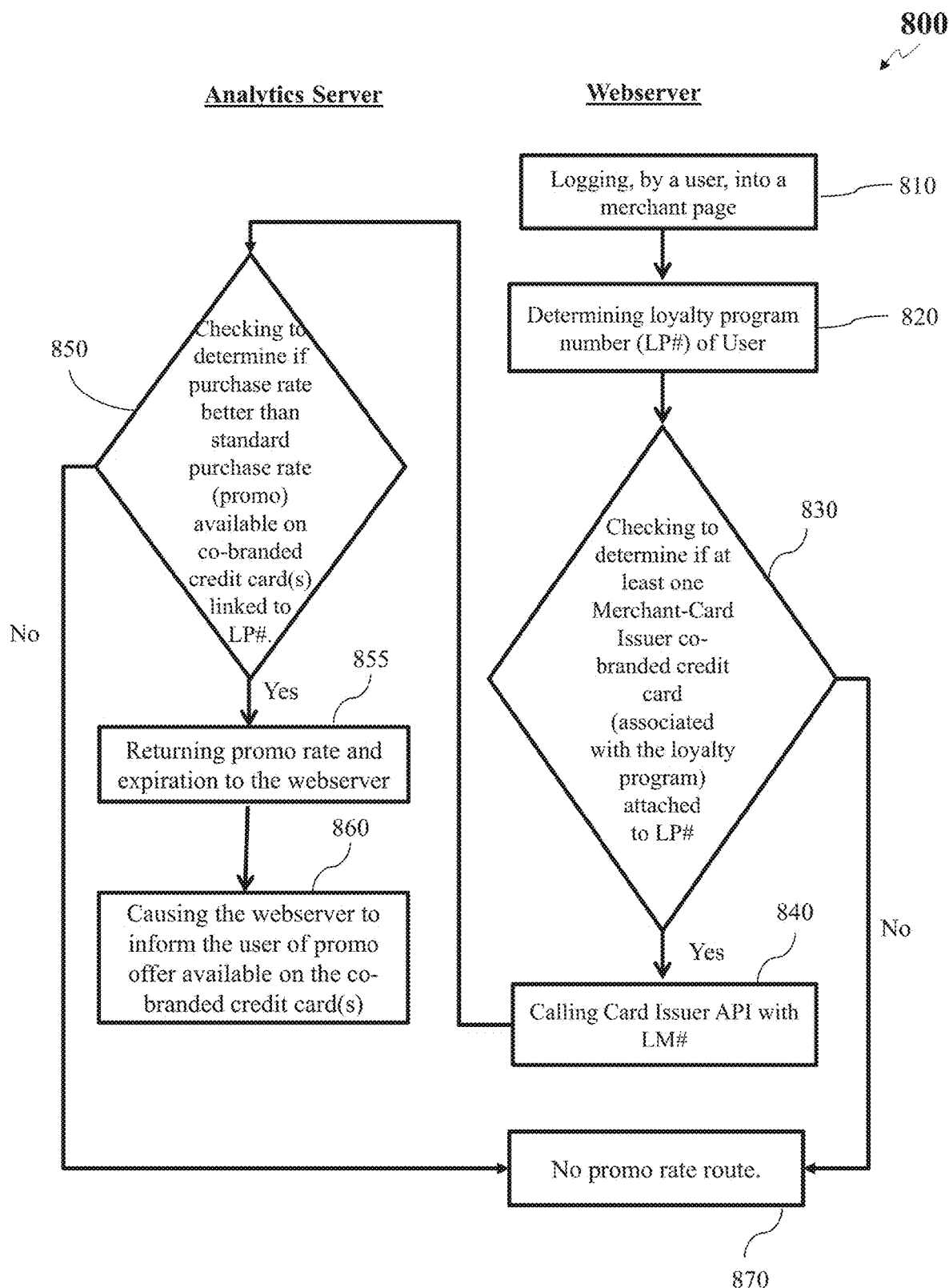
FIG. 8 illustrates a flowchart depicting operational steps for providing promotion (promo) rate offers to a user, in accordance with an embodiment.

FIG. 8 illustrates a flowchart depicting operational steps for providing promotion (promo) rate offers to a user, in accordance with an embodiment. Webserver-side processing steps 810, 820, 830, 840, 870 may be similar to the webserver-side processing steps 610, 620, 630, 640, 670 (see FIG. 6), respectively.

At step 850, an analytics server (or a credit card issuer-side system) may check to determine if a promotional (promo) purchase rate (e.g., purchase rate better than standard purchase rate) is available on the co-branded credit card(s) linked to the program number or the user identifier. In some configurations, the analytics server may not offer a promotional rate. Instead, the analytics server may offer a standard purchase rate associated with a particular card. This offering may still benefit the user because it offers transparency and predictability of a fixed payment schedule.

At step 855, in response to determining that a promo purchase rate is available on the co-branded credit card(s) linked to the program number, the analytics server may return a promo rate and an expiration thereof to the merchant-side system. In response to determining that a promo purchase rate is not available on the co-branded credit card(s) linked to the program number, the analytics server may proceed to 870.

At step 860, in response to the analytics server determining that a promo purchase rate is available on the co-branded credit card(s) linked to the program number, the analytics server may cause the webserver to inform the user of the returned promo offer (e.g., promo rate and expiration) available on the co-branded credit card(s).

Figure 9:
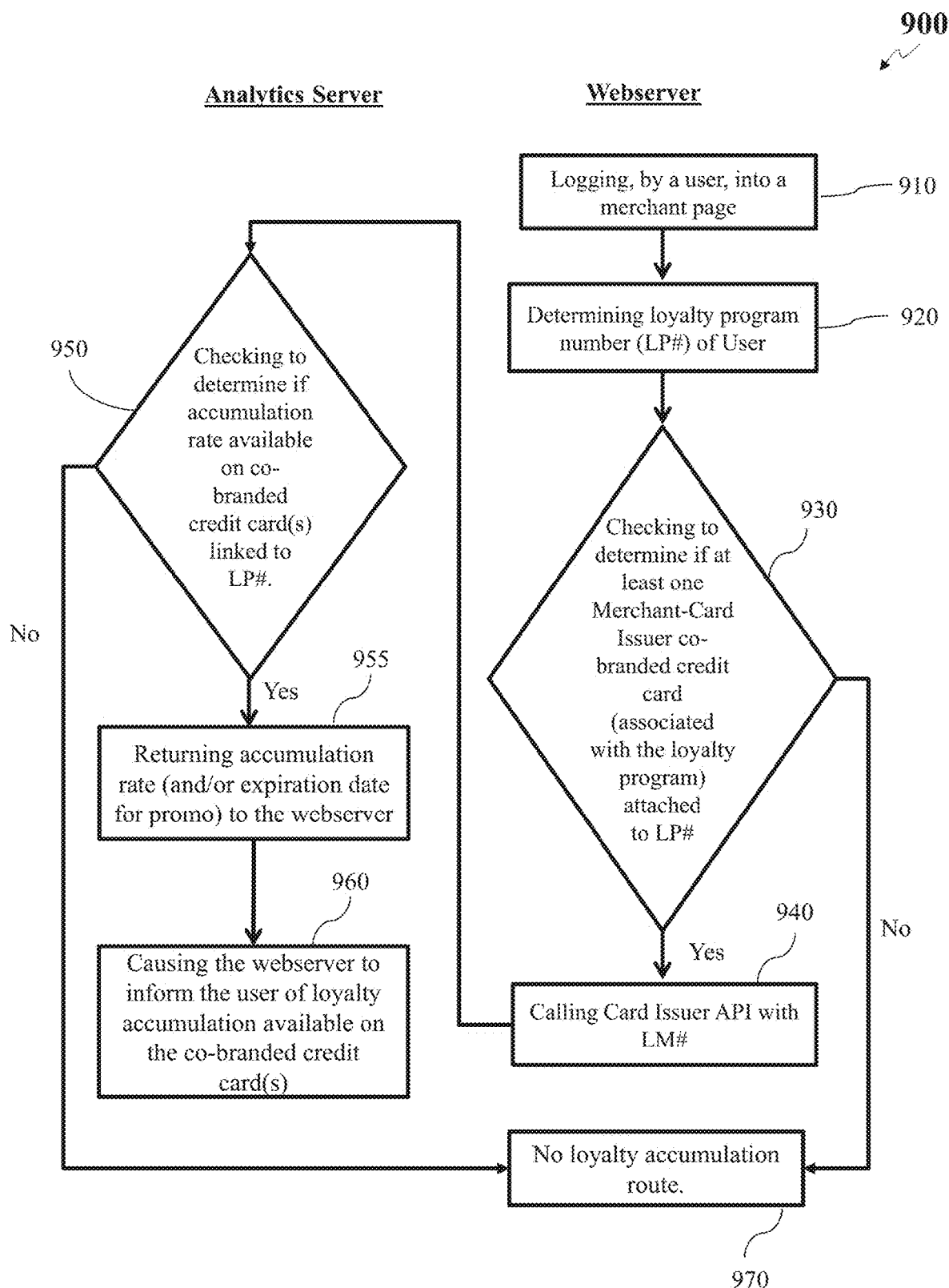
FIG. 9 illustrates a flowchart depicting operational steps for providing accumulation rate offers to a user, in accordance with an embodiment.

FIG. 9 illustrates a flowchart depicting operational steps for providing accumulation rate offers to a user, in accordance with an embodiment. Webserver-side processing steps 910, 920, 930, 940, 970 may be similar to the webserver-side processing steps 610, 620, 630, 640, 670 (see FIG. 6), respectively.

At step 950, an analytics server (or a credit card issuer-side system) may check to determine if an accumulation purchase rate (e.g., promo purchase rate based on loyalty accumulation of a user) is available on the co-branded credit card(s) linked to the program number or the user identifier.

At step 955, in response to determining that an accumulation purchase rate is available on the co-branded credit card(s) linked to the program number, the analytics server may return an accumulation purchase rate and an expiration thereof to the merchant-side system. In response to determining that an accumulation purchase rate is not available on the co-branded credit card(s) linked to the program number, the analytics server may proceed to 970.

At step 960, in response to the analytics server determining that an accumulation purchase rate is available on the co-branded credit card(s) linked to the program number, the analytics server may cause the webserver to inform the user of the returned accumulation promo offer (e.g., accumulation purchase rate and expiration) available on the co-branded credit card(s).

Figure 10:
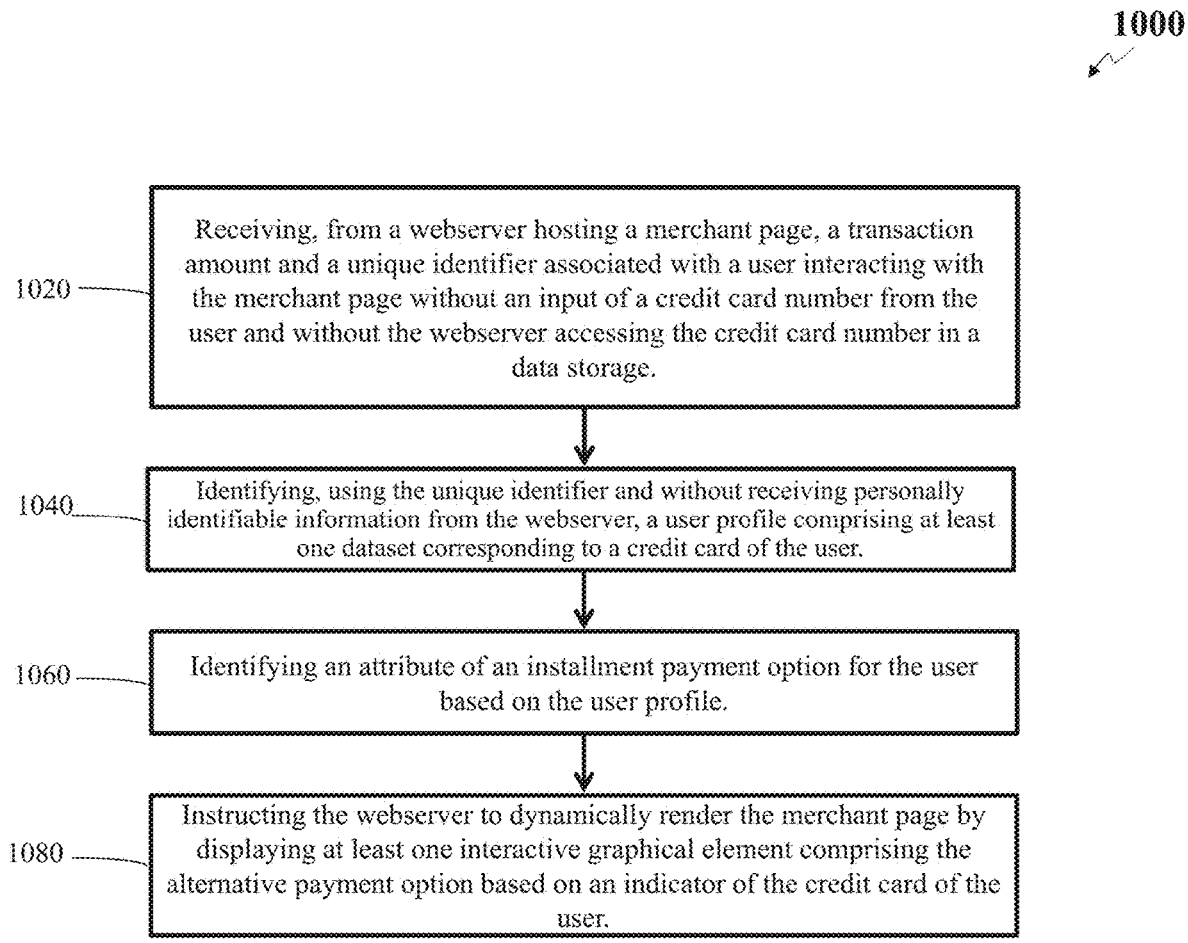
FIG. 10 illustrates a flowchart depicting operational steps for dynamically revising page with payment financing options, in accordance with an embodiment.

FIG. 10 illustrates a flowchart depicting operational steps for dynamically revising a merchant page with consumer-customized payment options by one or more processors communicatively coupled to a plurality of webservers hosting a plurality of merchant pages, in accordance with an embodiment. The method 700 describes how a server, such as the analytics server described in FIG. 1, displays various customer-specific interactive graphical user interfaces and elements configured to receive users' inputs. Even though the method 700 is described as being executed by the webserver, the method 700 can be executed by any server and/or locally within a user's computing device or as a browser extension. Additionally or alternatively, the method 700 can be executed by a webserver acting as both a webserver and the analytics server by hosting the website and generating the graphical elements described herein. Furthermore, other configurations of the method 700 may comprise additional or alternative steps, or may omit one or more steps altogether.

At step 1020, one or more processors of a payment financing system (e.g., analytics server 140, payment financing system 200 in FIG. 1 and FIG. 2) may receive, from a webserver (e.g., webserver 120) hosting a merchant page (e.g., checkout page 300 in FIG. 3), a transaction amount and a unique identifier (e.g., loyalty program number) associated with a user of a user computing device (e.g., computing device 110) interacting with the merchant page without an input of a credit card number of the user (e.g., no entry of credit card number in a COF scenario as shown in FIG. 3; no entry of credit card number until the system is ready to show financing offers or installment payment options in a non-COF scenario as shown in FIG. 4) and without the webserver accessing the credit card number in a data storage (e.g., webserver 210 instead invokes an offer API 217 to cause analytic server or card financing system 220 to access credit card information in databases 250; see FIG. 2).

The merchant page (e.g., page 300 or page 400 in FIGS. 3-4) may be a checkout page of a merchant associated with the webserver. The one or more processors may receive the unique identifier (e.g., loyalty program number) from the webserver in response to the webserver determining that the user has a credit card that is associated with the unique identifier. For example, the webserver may perform this checking using user profile data (which may be stored in databases 130, 250) which indicate whether at least one co-branded credit card is associated with the user or the program number. The co-branded credit card may be based on the merchant-card issuer partnership and may be associated with the program.

At step 1040, the one or more processors of the system may identify, using the unique identifier (e.g., loyalty program number) and without receiving personally identifiable information from the webserver, a user profile comprising at least one dataset corresponding to a credit card of the user. For example, the system may identify a user profile by accessing databases (e.g., databases 250) which store customer information. The customer information may include customer's personally identifiable information (e.g., name, age, and other demographic data), payment information (e.g., card numbers or other unique identifiers associated with customers' payment card and other payment information), and program information associated with customers (e.g., name and partner (merchant) of loyalty programs, loyalty program membership numbers (or loyalty program numbers) associated with customers, co-brand credit card information associated with loyalty program numbers).

At step 1060, the one or more processors of the payment financing system may identify an attribute of an alternative payment option for the user based on the user profile. For example, an installment payment option (e.g., installment payment option 313 in FIG. 3) may include different attributes such as installment amount ($47), installment rate (5.99% APR), and installment duration (9 months).

The one or more processors may select the credit card of the user among a set of credit cards of the user within the user profile based on a promotional offer associated with the selected credit card of the user. For example, using a program number or program identifier, the analytics server may identify a customer profile associated with the user, which includes program information associated with one or more co-branded credit cards. Based on the program information, the analytics server may select the credit card of the user among a set of credit cards of the user to make best financing offers to the user.

The alternative payment option may be an installment payment option (e.g., installment payment options 311 in FIG. 3). The attribute of the alternative payment option (e.g., payment option 313) may correspond to at least one of a monthly amount (e.g., $47/month), a number of installments (e.g., 9 months), or an interest rate (e.g., 5.99% APR). The alternative payment option may correspond to an annual percentage rate that satisfies a threshold. For example, the system may select an installment payment option (installment payment option 313 with 5.99% APR in FIG. 3) that has an APR smaller than a threshold of 7%. In some configurations, the threshold may be set to 0% (e.g., merchant funded).

Upon identifying the attribute, the one or more processors may generate an instruction for the webserver. At step 1080, the one or more processors of the payment financing system may instruct the webserver to dynamically render the merchant page by displaying at least one interactive graphical element (e.g., installment options 311 in FIG. 3) comprising the alternative payment option (e.g., installment payment options 312-315) based on an indicator of the credit card of the user (e.g., information "Platinum ****8204" of the credit card on file in FIG. 3). The indicator of the credit card of the user may correspond to a partial number of the credit card of the user (e.g., last 4 digits 323 in FIG. 3).

The method may further include instructing, by the one or more processors, the webserver to dynamically revise the merchant page by displaying at least a portion of the credit card number of the user (e.g., last 4 digits 323 in FIG. 3; last 4 digits 424 in FIG. 4).

Responsive to a selected interactive graphical element on the merchant page, the one or more processors may execute the alternative payment option based on the selected interactive graphical element. For example, once the user selects an installment payment option (e.g., option 313 in FIG. 3), the webserver may invoke an API (e.g., fulfillment API 218) to execute or fulfill the selected installment payment option. In executing the alternative payment option, the one or more processors may add the transaction amount to an account associated with the credit card number of the user. The transaction amount is not routed to a secondary server (e.g., secondary server 160 in FIG. 1) associated with facilitating the transaction. For example, the functionality attributed to the secondary server may be performed by the analytics server, so that the analytics server may display installment payment options, receive a selection, and facilitate the transaction by transmitting the purchase price directly to a merchant account. The analytics server may then revise a data record within the database recording the user's new debt obligation. The secondary server may be associated with a credit card company.

Using the methods and systems described herein, one or more processors of a payment financing system (e.g., analytics server associated with the payment financing system described herein and depicted, for instance, in FIGS. 1-2) can leverage a merchant's own identifier (assigned to different cards and established as part of a loyalty-like co-brand card solution) to identify and promote card benefits in advance of card entry or COF selection (on a merchant website or other customer-facing electronic platforms, such as an application) and thereby influence choice of card used in a transaction. As a result, when employing the methods and systems discussed herein, the analytics server does not need to generate new identifiers and can be seamlessly integrated into existing and conventional systems to improve said systems.

The methods and systems described herein can be used in conjunction or in lieu of a COF-based exchange of information between merchant and an issuer. Therefore, the analytics server can co-exist with a merchant's COF base (e.g., card proxies established through a loyalty-look up approach can be matched by the merchant against what the merchant has stored as COF).

In a non-limiting example, the analytics server can utilize the methods and systems discussed herein to use a merchant's identifier to analyze different payment methods and instruct the merchant to dynamically update a merchant page (e.g., website or a graphical user interface of an application) to promote a particular payment method (e.g., promote a particular card). In some embodiments, the analytics server may instruct a server to dynamically revise a merchant page by displaying language that would promote an alternative payment method. For instance, the analytics server may dynamically instruct a server to update the merchant page and insert language, such as "did you know that you can pay for this purchase over time with your card," "did you know that you have a promotional financing rate of x % currently available on your card," or "did you know that you can earn three times the points by using your card," and the like.

Using the methods and systems described herein, the analytics server may also offer seamless card enrollment. For instance, the analytics server may revise the merchant page and display a graphical input element that allows the user to enroll for a particular payment method (e.g., enrollment for COF) without requiring the user to enter their card number.

The methods and systems described herein can be used for merchants with low COF penetration (because the analytics server requires a low exchange of data). Some current systems and methods provide low COF penetration. As used herein, low COF penetration refers to a situation in which an exchange of COF information (to influence choice of card) between the merchant and issuer is not practical (e.g., due to technical and other challenges). For instance, sharing card information with the issuer to obtain possible benefits associated with that card after card entry (technical limitations aside) offers less opportunity to influence choice of card as the user has already invested in entering the card information. Using the methods and systems discussed herein, the analytics server can dynamically revise different merchant pages to influence the user. However, the methods and systems discussed herein do not preclude a COF solution.

For instance, a user may access a merchant page to facilitate a transaction (e.g., buy a product). As a result, a merchant server may transmit an identifier of the user in real time (or near real time as the user is purchasing the product via merchant page) to the analytics server. For instance, the merchant may transmit the user's loyalty number (and optionally a price associated with the transaction) to the analytics server. The analytics server may then retrieve a list of cards associated with the user. Before the user is directed towards the payment page or the checkout page, the analytics server can transmit the list of cards back to merchant server. The merchant server can then use the information received from the analytics server to match a card identified by the analytics server with a COF (e.g., a card that is on file with the merchant).

In a first embodiment, if the merchant identifies a COF that matches the payment card identified by the analytics server and if that particular card is the default COF, the analytics server may revise a merchant page (e.g., the checkout page) and present the identified payment card along with any benefits (e.g., "use your card that is already on file and receive three times the points").

In a second embodiment, if the payment card identified by the analytics server does not match any stored COF (or if the user does not have any cards on file), the analytics server may revise the merchant page and display a payment option generated by the analytics server (e.g., "pay for this transaction using your card that ends in 1234").

In a third scenario, if the merchant identifies a COF that matches the card identified by the analytics server but that particular card is not the default COF, the analytics server may then revise the merchant page and display an awareness banner for the user. The awareness banner may attempt to influence the user to enter the account number of the eligible co-branded credit card to see the offer details.

If the card used by the user to complete the transaction is not on file, the analytics server may also display a graphical input element offering an automatic enrollment of the card. When the user accepts the enrollment offer, the analytics server may transmit the data necessary to enroll the card with the merchant (e.g., card number or other information). As a result, the user does not need to provide any additional information or input card information in the system.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for dynamically revising an electronic page by one or more processors not directly hosting the electronic page but communicatively coupled to a plurality of webservers hosting a plurality of electronic pages, the method comprising:
    transmitting, by the one or more processors through a pluggable component, a token to a webserver of the plurality of webservers;
    upon receiving authorization by the webserver based on the transmitted token, receiving, by the one or more processors through the pluggable component, from the webserver of the plurality of webservers hosting the electronic page of the plurality of electronic pages, a network operation attribute and a unique identifier associated with a user of a user computing device interacting with the electronic page without an input of an identification number of the user and without the webserver accessing the identification number in a data storage, wherein the unique identifier is not personally identifiable information of the user;
    identifying, by the one or more processors using the unique identifier and without receiving personally identifiable information from the webserver, a user profile comprising at least one dataset corresponding to an account of the user, whereby the one or more processors automatically identify payment information of the user without receiving the identification number and personally identifiable information from the user;
    identifying, by the one or more processors, an attribute of an alternative network operation option for the user based on the user profile;
    upon identifying the attribute of the alternative network operation option for the user based on the user profile, generating, by the one or more processors, at least one interactive graphical element including the attribute of the alternative network operation option and an indicator of the account of the user, wherein the at least one interactive graphical element includes at least one element that maintains a look and feel of the electronic page;
    transmitting, by the one or more processors through the pluggable component prior to the webserver rendering a payment page, an instruction to the webserver to dynamically render the electronic page by displaying the at least one interactive graphical element including the attribute of the alternative network operation option and the indicator of the account of the user;
    receiving, by the one or more processors through the pluggable component, from the webserver, an indication of an input via an input element of the electronic page dynamically rendered by the webserver hosting the electronic page in response to the instruction from the one or more processors not hosting the electronic page; and
    instructing, by the one or more processors through the pluggable component, execution of a network operation by transmitting the indication of the input to a secondary server along with a second instruction based at least in part on the indication.

2. The method of claim 1, further comprising:
    responsive to a selected interactive graphical element on the electronic page, transmitting, by the one or more processors, the alternative network operation option based on the selected interactive graphical element to a server associated with the account.

3. The method of claim 2, wherein executing the alternative network operation option comprises: adding, by the one or more processors, the network operation attribute to an account associated with the identification number of the user.

4. The method of claim 1, further comprising:
    instructing, by the one or more processors, the webserver to dynamically revise the electronic page by displaying at least a portion of the identification number of the user.

5. The method of claim 1, wherein the alternative network operation option corresponds to an annual percentage rate that satisfies a threshold.

6. The method of claim 1, wherein the one or more processors receive the unique identifier from the webserver in response to the webserver determining that the user has an account that is associated with the unique identifier.

7. The method of claim 1, wherein the attribute of the alternative network operation option corresponds to at least one of a monthly amount, a number of installments, or an interest rate.

8. The method of claim 1, wherein the electronic page is a checkout page of a merchant associated with the webserver.

9. The method of claim 1, wherein the indicator of the account of the user corresponds to a partial number of the account of the user.

10. The method of claim 1, wherein the one or more processors select the account of the user among a set of accounts of the user within the user profile based on a promotional offer associated with the selected account of the user.

11. A system for dynamically revising an electronic page by one or more processors not directly hosting the electronic page but communicatively coupled to a plurality of webservers hosting a plurality of electronic pages, the system comprising:
    the one or more processors that are configured to:
        transmit, through a pluggable component, a token to a webserver of the plurality of webservers;
        upon receiving authorization by the webserver based on the transmitted token, receive, from the webserver hosting the electronic page through the pluggable component, a network operation attribute and a unique identifier associated with a user of a user computing device interacting with the electronic page without an input of an identification number of the user and without the webserver accessing the identification number in a data storage wherein the unique identifier is not personally identifiable information of the user;

identify, using the unique identifier and without receiving personally identifiable information from the webserver, a user profile comprising at least one dataset corresponding to an account of the user, whereby the one or more processors automatically identify payment information of the user without receiving the identification number and personally identifiable information from the user;

identify an attribute of an alternative network operation option for the user based on the user profile;

upon identifying the attribute of the alternative network operation option for the user based on the user profile, generate at least one interactive graphical element including the attribute of the alternative network operation option and an indicator of the account of the user, wherein the at least one interactive graphical element includes at least one element that maintains a look and feel of the electronic page;

transmit, through the pluggable component prior to the webserver rendering a payment page, an instruction to the webserver to dynamically render the electronic page by displaying the at least one interactive graphical element including the alternative network operation option and the indicator of the account of the user;

receive, through the pluggable component, from the webserver, an indication of an input via an input element of the electronic page dynamically rendered by the webserver hosting the electronic page in response to the instruction from the one or more processors not hosting the electronic page; and instruct, through the pluggable component, execution of a network operation by transmitting the indication of the input to a secondary server along with a second instruction based at least in part on the indication.

12. The system of claim 11, wherein the one or more processors are further configured to:
responsive to a selected interactive graphical element on the electronic page, transmit the alternative network operation option based on the selected interactive graphical element to a server associated with the account.

13. The system of claim 12, wherein in executing the alternative network operation option, the one or more processors are configured to:
add the network operation attribute to an account associated with the identification number of the user.

14. The system of claim 11, wherein the one or more processors are further configured to:
instruct the webserver to dynamically revise the electronic page by displaying at least a portion of the identification number of the user.

15. The system of claim 11, wherein the alternative network operation option corresponds to an annual percentage rate that satisfies a threshold.

16. The system of claim 11, wherein the one or more processors are configured to receive the unique identifier from the webserver in response to the webserver determining that the user has an account that is associated with the unique identifier.

17. The system of claim 11, wherein the attribute of the alternative network operation option corresponds to at least one of a monthly amount, a number of installments, or an interest rate.

18. The system of claim 11, wherein the electronic page is a checkout page of a merchant associated with the webserver.

19. The system of claim 11, wherein the indicator of the account of the user corresponds to a partial number of the account of the user.

20. The system of claim 11, wherein the one or more processors are configured to select the account of the user among a set of accounts of the user within the user profile based on a promotional offer associated with the selected account of the user.

* * * * *